(12) United States Patent
Sasaki

(10) Patent No.: US 8,059,512 B2
(45) Date of Patent: Nov. 15, 2011

(54) INFORMATION RECORDING MEDIUM, RECORDING METHOD, DATA STRUCTURE, INFORMATION RECORDING APPARATUS, PROGRAM, AND RECORDING MEDIUM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1358 days.

(21) Appl. No.: 10/574,195

(22) PCT Filed: Jun. 16, 2005

(86) PCT No.: PCT/JP2005/011487
§ 371 (c)(1),
(2), (4) Date: Jun. 19, 2006

(87) PCT Pub. No.: WO2005/124781
PCT Pub. Date: Dec. 29, 2005

(65) Prior Publication Data
US 2006/0250922 A1 Nov. 9, 2006

(30) Foreign Application Priority Data

Jun. 17, 2004 (JP) ................................. 2004-179754
Jun. 25, 2004 (JP) ................................. 2004-187989

(51) Int. Cl.
*G11B 7/00* (2006.01)
(52) U.S. Cl. ................. 369/59.25; 369/47.1; 369/53.17; 369/53.2; 369/30.11; 369/275.3
(58) Field of Classification Search ................. 369/47.1, 369/53.17, 53.2, 59.25, 30.11, 275.3, 94; 361/47.1, 53.17, 53.2, 59.25, 30.11, 275.3, 94
See application file for complete search history.

(56) References Cited

U.S. PATENT DOCUMENTS

| 5,881,032 A | 3/1999 | Ito et al. |
| 5,966,721 A | 10/1999 | Hirayama et al. |
| 6,076,135 A | 6/2000 | Hirayama et al. |
| 6,154,806 A | 11/2000 | Hirayama et al. |

(Continued)

FOREIGN PATENT DOCUMENTS

EP 0 715 301 6/1996

(Continued)

OTHER PUBLICATIONS

U.S. Appl. No. 10/058,029, filed Aug. 22, 2002, Yoshiyuki Sasaki.

*Primary Examiner* — Van Chow
(74) *Attorney, Agent, or Firm* — Dickstein Shapiro LLP

(57) ABSTRACT

A disk-shaped rewritable information recording medium having at a first recording layer and a second recording layer is disclosed. The information recording medium includes a first data area situated in the first recording layer, the first data area having a plurality of addresses allocated thereto, the plural addresses continuously increasing in a first direction, a second data area situated in the second recording layer, the second data area having a plurality of addresses allocated thereto, the plural addresses continuously increasing in a second direction opposite to the first direction, and a management information area having an area for recording end recorded area information thereto, the end recorded area information including information for identifying an area in the second data area having data that corresponds to an end position of the second data area.

64 Claims, 26 Drawing Sheets

| U.S. PATENT DOCUMENTS | | | |
|---|---|---|---|
| 6,233,649 B1 | 5/2001 | Hirayama et al. | |
| 6,324,618 B1 | 11/2001 | Hirayama et al. | |
| 6,332,174 B1 | 12/2001 | Hirayama et al. | |
| 6,347,353 B1 | 2/2002 | Hirayama et al. | |
| 6,424,614 B1 | 7/2002 | Kawamura et al. | |
| 7,260,039 B2 * | 8/2007 | Suh | 369/53.17 |
| 2004/0156294 A1 | 8/2004 | Watanabe et al. | |
| 2005/0025015 A1 | 2/2005 | Horibata | |
| 2005/0036427 A1 | 2/2005 | Suh | |

| FOREIGN PATENT DOCUMENTS | | |
|---|---|---|
| EP | 1 492 117 | 12/2004 |
| JP | 11-273082 | 10/1999 |
| JP | 2000-503446 | 3/2000 |
| JP | 2002-237050 | 8/2002 |
| JP | 3558306 | 5/2004 |
| JP | 2005-11487 | 1/2005 |
| WO | WO 02/086873 A1 | 10/2002 |
| WO | WO 03/105141 | 12/2003 |

* cited by examiner

FIG.7A
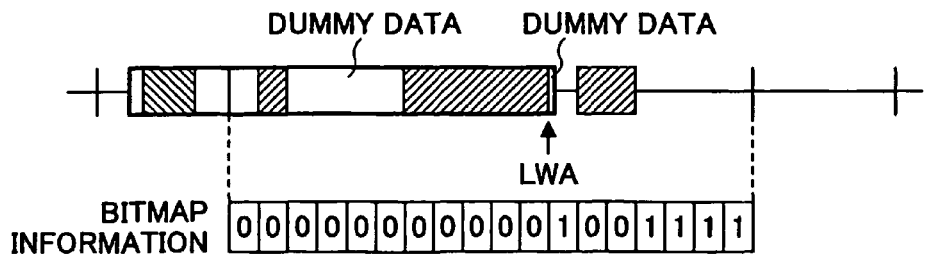
FIG.7B
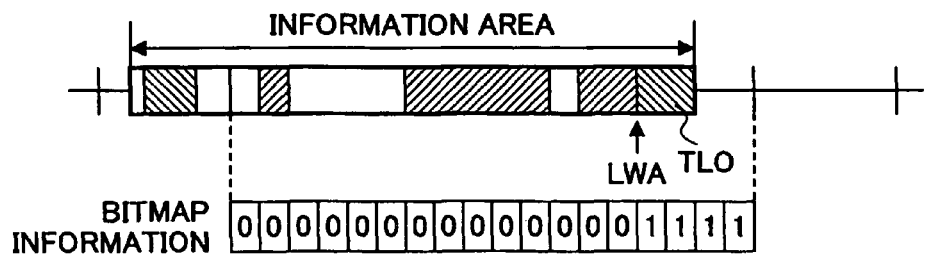
FIG.8
| CONTENT | BYTE NUMBER |
|---|---|
| IDENTIFICATION ID | 4 |
| RESTRICTION INFORMATION FOR UNKNOWN IDENTIFICATION ID | 4 |
| DRIVE ID | 32 |
| UPDATE COUNT | 4 |
| FORMAT STATUS | 4 |
| LAST WRITTEN ADDRESS (LWA) | 4 |
| LAST VERIFIED ADDRESS (LVA) | 4 |
| BITMAP START ADDRESS | 4 |
| BITMAP LENGTH | 4 |
| DISC ID | 32 |
| RESERVATION | – |
| BITMAP | 9 × 2048 |
| RESERVATION | – |

LASER BEAM

| CONTENT | BYTE NUMBER |
|---|---|
| IDENTIFICATION ID | 4 |
| RESTRICTION INFORMATION FOR UNKNOWN IDENTIFICATION ID | 4 |
| DRIVE ID | 32 |
| UPDATE COUNT | 4 |
| FORMAT STATUS | 4 |
| LAST WRITTEN ADDRESS (LWA) | 4 |
| LAST VERIFIED ADDRESS (LVA) | 4 |
| BITMAP START ADDRESS | 4 |
| BITMAP LENGTH | 4 |
| DISC ID | 32 |
| LAST UNWRITTEN ADDRESS (LUA) | 4 |
| ZONE LAST WRITTEN ADDRESS (ZONE LWA) | 4 |
| RESERVATION | – |
| BITMAP | 9 × 2048 |
| RESERVATION | – |

FIG.21

| CONTENT | BYTE NUMBER |
|---|---|
| IDENTIFICATION ID | 4 |
| RESTRICTION INFORMATION FOR UNKNOWN IDENTIFICATION ID | 4 |
| DRIVE ID | 32 |
| UPDATE COUNT | 4 |
| FORMAT STATUS | 4 |
| LAST WRITTEN ADDRESS (LWA) OF LAYER N | 4 |
| LAST VERIFIED ADDRESS (LVA) OF LAYER N | 4 |
| BITMAP START ADDRESS OF LAYER N | 4 |
| BITMAP LENGTH OF LAYER N | 4 |
| DISC ID | 32 |
| LAYER NUMBER = N(N=0,1) | 1 |
| LAST UNWRITTEN ADDRESS (LUA) OF LAYER N | 4 |
| ZONE LAST WRITTEN ADDRESS (ZONE LWA) OF LAYER N | 4 |
| RESERVATION | − |
| BITMAP OF LAYER N | 9 × 2048 |
| RESERVATION | − |

FIG.22

| CONTENT | BYTE NUMBER |
|---|---|
| IDENTIFICATION ID | 4 |
| RESTRICTION INFORMATION FOR UNKNOWN IDENTIFICATION ID | 4 |
| DRIVE ID | 32 |
| UPDATE COUNT | 4 |
| FORMAT STATUS | 4 |
| LAST WRITTEN ADDRESS (LWA) | 4 |
| LAST VERIFIED ADDRESS (LVA) | 4 |
| BITMAP START ADDRESS | 4 |
| BITMAP LENGTH | 4 |
| DISC ID | 32 |
| LAST UNWRITTEN ADDRESS (LUA) | 4 |
| ZONE LAST WRITTEN ADDRESS (ZONE LWA) | 4 |
| ZONE NUMBER | 2 |
| START ADDRESS OF ZONE 1 | 4 |
| END ADDRESS OF ZONE 1 | 4 |
| ⋮ | ⋮ |
| START ADDRESS OF ZONE m | 4 |
| END ADDRESS OF ZONE m | 4 |
| RESERVATION | – |
| BITMAP | 9 × 2048 |
| RESERVATION | – |

FIG.23

| CONTENT | BYTE NUMBER |
|---|---|
| IDENTIFICATION ID | 4 |
| RESTRICTION INFORMATION FOR UNKNOWN IDENTIFICATION ID | 4 |
| DRIVE ID | 32 |
| UPDATE COUNT | 4 |
| FORMAT STATUS | 4 |
| LAST WRITTEN ADDRESS (LWA) OF LAYER N | 4 |
| LAST VERIFIED ADDRESS (LVA) OF LAYER N | 4 |
| BITMAP START ADDRESS OF LAYER N | 4 |
| BITMAP LENGTH OF LAYER N | 4 |
| DISC ID | 32 |
| LAYER NUMBER = N(N=0,1) | 1 |
| LAST UNWRITTEN ADDRESS (LUA) OF LAYER N | 4 |
| ZONE LAST WRITTEN ADDRESS (ZONE LWA) OF LAYER N | 4 |
| ZONE NUMBER | 2 |
| START ADDRESS OF ZONE 1 | 4 |
| END ADDRESS OF ZONE 1 | 4 |
| ⋮ | ⋮ |
| START ADDRESS OF ZONE m | 4 |
| END ADDRESS OF ZONE m | 4 |
| RESERVATION | - |
| BITMAP OF LAYER N | 9 × 2048 |
| RESERVATION | - |

FIG.24

| CONTENT | BYTE NUMBER |
|---|---|
| IDENTIFICATION ID | 4 |
| RESTRICTION INFORMATION FOR UNKNOWN IDENTIFICATION ID | 4 |
| DRIVE ID | 32 |
| UPDATE COUNT | 4 |
| FORMAT STATUS | 4 |
| LAST WRITTEN ADDRESS (LWA) OF LAYER N | 4 |
| LAST VERIFIED ADDRESS (LVA) OF LAYER N | 4 |
| BITMAP START ADDRESS OF LAYER N | 4 |
| BITMAP LENGTH OF LAYER N | 4 |
| DISC ID | 32 |
| LAYER NUMBER = N(N=0,1) | 1 |
| LAST UNWRITTEN ADDRESS (LUA) OF LAYER N | 4 |
| ZONE NUMBER | 2 |
| START ADDRESS OF ZONE 1 | 4 |
| END ADDRESS OF ZONE 1 | 4 |
| ZONE LWA OF ZONE 1 | 4 |
| ⋮ | ⋮ |
| START ADDRESS OF ZONE m | 4 |
| END ADDRESS OF ZONE m | 4 |
| ZONE LWA OF ZONE m | 4 |
| RESERVATION | – |
| BITMAP OF LAYER N | 9 × 2048 |
| RESERVATION | – |

FIG.26A

| CONTENT | BYTE NUMBER |
|---|---|
| IDENTIFICATION ID | 4 |
| RESTRICTION INFORMATION FOR UNKNOWN IDENTIFICATION ID | 4 |
| DRIVE ID | 32 |
| UPDATE COUNT | 4 |
| FORMAT STATUS | 4 |
| LAST WRITTEN ADDRESS (LWA) | 4 |
| LAST VERIFIED ADDRESS (LVA) | 4 |
| BITMAP START ADDRESS | 4 |
| BITMAP LENGTH | 4 |
| DISC ID | 32 |
| LAST UNWRITTEN ADDRESS (LUA) | 4 |
| RESERVATION | - |
| BITMAP | 9 × 2048 |
| RESERVATION | - |

FIG.26B

| CONTENT | BYTE NUMBER |
|---|---|
| IDENTIFICATION ID | 4 |
| RESTRICTION INFORMATION FOR UNKNOWN IDENTIFICATION ID | 4 |
| DRIVE ID | 32 |
| UPDATE COUNT | 4 |
| FORMAT STATUS | 4 |
| LAST WRITTEN ADDRESS (LWA) OF LAYER N | 4 |
| LAST VERIFIED ADDRESS (LVA) OF LAYER N | 4 |
| BITMAP START ADDRESS OF LAYER N | 4 |
| BITMAP LENGTH OF LAYER N | 4 |
| DISC ID | 32 |
| LAYER NUMBER = N(N=0,1) | 1 |
| LAST UNWRITTEN ADDRESS (LUA) OF LAYER N | 4 |
| RESERVATION | - |
| BITMAP OF LAYER N | 9 × 2048 |
| RESERVATION | - |

INFORMATION RECORDING MEDIUM, RECORDING METHOD, DATA STRUCTURE, INFORMATION RECORDING APPARATUS, PROGRAM, AND RECORDING MEDIUM

TECHNICAL FIELD

The present invention relates to an information recording medium, a recording method, a data structure, an information recording apparatus, a program, and a recording medium, and more particularly, to a rewritable information recording medium having multiple recording layers, a recording method for recording information to a rewritable information recording medium having multiple recording layers, a data structure of information to be recorded to said information recording medium, an information recording apparatus capable of recording information to a rewritable information recording medium having multiple recording layers, a program used for said information recording apparatus, and a recording medium to which said program is recorded.

BACKGROUND ART

Along with the advances of digital technology and improvement of data compression technology in recent years, optical disks such as DVDs (Digital Versatile Disk) are receiving greater attention as information recording media for recording information including, for example, music, movies, and photographs (hereinafter referred to as "contents"). Furthermore, more optical disk apparatuses are being used as information recording apparatuses for recording contents to disks as the price of the optical disk is becoming lower. It is to be noted that apparatuses for accessing information recording media are collectively referred to as "drive apparatuses".

As for recordable optical disks (also referred to as "recording type disk") that are commercially sold, there is a write-once type disk (write-once-read-many optical disk) to which information can be written only once (e.g., DVD+R, DVD-R) and a rewritable type disk (e.g., DVD+RW, DVD-RW).

Furthermore, the recording capacity of recording type disks is expected to further increase along with an increase in the amount of information contained in the contents. Furthermore, as a measure for increasing the amount of information recordable on a recording type disk, vigorous research and development being made on a recording type disk having multiple recording layers (hereinafter referred to as "multilayer recording type disk") and an apparatus for handling the multilayer recording type disk (See, for example, Japanese Laid-Open Patent Application No. 8-96406).

It is to be noted that a single-sided dual layer DVD-ROM (DVD-ROM having two layers on one side of the disk) is being commercially sold as a read only memory disk having two recording layers. In the single-sided dual layer DVD-ROM, information on each recording layer is reproduced by irradiating a laser beam from one side and matching the focal point of the laser beam to each recording layer. That is, with the single-sided dual layer DVD-ROM, information can be reproduced without having to turn over (flip over) the disk. In the single-sided dual layer DVD-ROM, data is required to be recorded on both first and second recording layers (for example, Layer 0, Layer 1) of the disk. For example, supposing that Layer 0 is a recorded layer having data recorded thereto and Layer 1 is an unrecorded layer having no data recorded thereto, address information may be obtained and an address error may occur in a case where vibration or the like during a seek operation or a reproduction operation causes the laser beam to focus on Layer 1. Therefore, without having data recorded to both layers, the Dual Layer DVD-ROM will be determined to be a defective disk and may be unable to continue reproduction of data.

Meanwhile, since conventional drive apparatuses corresponding to a read only memory type optical disk are widely used, it is important that the contents recorded to the multilayer recording type disk can also be reproduced with a conventional drive apparatus. That is, the contents recorded to a recording type disk are required to be logically compatible with the conventional read only memory optical disk.

Therefore, in a case where a multilayer recording type disk is expected to be reproduced with a conventional drive apparatus, some kind of data is to be recorded in the unrecorded area (area where no contents are recorded) of the disk so that all of the multiple recording layers of disks have data recorded thereto. However, in a case where the amount of information contained in the contents is little with respect to the recording capacity of the multilayer recording type disk, a vast amount of time is required for recording dummy data in the unrecorded area of the disk. This may lead to degrading of recording performance. The degrading of recording performance may occur particularly with a rewritable multilayer recording type disk that conducts a formatting process in the background. Since contents can be recorded before a formatting process is actually completed, the rewritable multilayer recording type disk will have an undesired coexistence of a recorded area (area to which the contents are recorded), a dummy data area (area to which dummy data is recorded), and an unrecorded area (area to which no data is recorded) after the contents are recorded to the disk. Furthermore, in a process of providing logical compatibility with a read only memory optical disk, there is a risk that dummy data recorded to the disk in the formatting process may be overwritten. This results in further degrading of recording performance.

DISCLOSURE OF INVENTION

It is a general object of the present invention to provide an information recording medium, a recording method, a data structure, an information recording apparatus, a program, and a recording medium that substantially obviate one or more of the problems caused by the limitations and disadvantages of the related art.

It is another general object of the present invention to provide a rewritable information recording medium having multiple recording layers which can be provided with compatibility to a read only memory information recording medium at a short time.

It is yet another general object of the present invention to provide a data structure which can provide compatibility to a read only memory information recording medium at a short time with respect to a recordable information recording medium.

It is yet another general object of the present invention to provide a recording method and an information recording apparatus which can provide compatibility to a read only memory information recording medium at a short time with respect to a rewritable information recording medium having multiple recording layers.

It is yet another general object of the present invention to provide a program executed by a computer (controlling computer) of an information recording apparatus for providing compatibility to a read only memory information recording medium at a short time with respect to a rewritable information recording medium having multiple recording layers, and a recording medium having such program recorded thereto.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an information recording medium, a recording method, a data structure, an information recording apparatus, a program, and a recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a disk-shaped rewritable information recording medium having at a first recording layer and a second recording layer, the information recording medium including: a first data area situated in the first recording layer, the first data area having a plurality of addresses allocated thereto, the plural addresses continuously increasing in a first direction; a second data area situated in the second recording layer, the second data area having a plurality of addresses allocated thereto, the plural addresses continuously increasing in a second direction opposite to the first direction; and a management information area having an area for recording end recorded area information thereto, the end recorded area information including information for identifying an area in the second data area having data that corresponds to an end position of the second data area.

In the information recording medium according to an embodiment of the present invention, the management information area may further have an area for recording start recorded area information thereto, the start recorded area information including information for identifying an area to which data is continuously recorded from a start position of a combined data area including the first data area and the second data area.

In the information recording medium according to an embodiment of the present invention, the management information area may further have an area for recording reference recorded area information thereto, the reference recorded area information including information for identifying an area to which data is continuously recorded from a reference position provided in the second data area.

Furthermore, the present invention provides another disk-shaped rewritable information recording medium having at least a first recording layer and a second recording layer, the information recording medium including: a first data area situated in the first recording layer, the first data area having a plurality of addresses allocated thereto, the plural addresses continuously increasing in a first direction; a second data area situated in the second recording layer, the second data area having a plurality of addresses allocated thereto, the plural addresses continuously increasing in a second direction opposite to the first direction; and a management information area including end recorded area information, the end recorded area information including information for identifying an area in the second data area having data that corresponds to an end position of the second data area.

In the information recording medium according to an embodiment of the present invention, the end recorded area information may be information related to an end position of an unrecorded area situated at a position in the second data area that is nearest to the end position of the second data area.

In the information recording medium according to an embodiment of the present invention, the management information area may further include reference recorded area information for identifying an area to which data is continuously recorded from a reference position provided in the second data area.

In the information recording medium according to an embodiment of the present invention, the first direction may be a direction oriented from an inner periphery of the information recording medium to an outer periphery of the information recording medium, wherein the second direction may be a direction oriented from the outer periphery of the information recording medium to the inner periphery of the information recording medium.

In the information recording medium according to an embodiment of the present invention, the first data area and the second data area may have logical addresses continuing from a start position of the first data area to an end position of the second data area.

In the information recording medium according to an embodiment of the present invention, the management information area may further include start recorded area information for identifying an area to which data is continuously recorded from a start position of a combined data area including the first data area and the second data area.

In the information recording medium according to an embodiment of the present invention, the start recorded area information may be information related to an end position of an area to which data is continuously recorded from the start position of the combined data area.

In the information recording medium according to an embodiment of the present invention, the start recorded area information may include information indicative of an end position of an area to which data is continuously recorded from a start position of the first data area in the first recording layer, and information indicative of an end position of an area to which data is continuously recorded from a start position of the second data area in the second recording layer.

Furthermore, the present invention provides a recording method for recording information to a disk-shaped rewritable information recording medium having at least a first recording layer provided with a first data area having a plurality of addresses allocated thereto and a second recording layer provided with a second data area having a plurality of addresses allocated thereto, the plural addresses of the first data area continuously increasing in a first direction, the plural addresses of the second data area continuously increasing in a second direction opposite to the first direction, the recording method including a step of: recording end recorded area information to the information recording medium for identifying an area in the second data area having data that corresponds to an end position of the second data area.

In the recording method according to an embodiment of the present invention, the recording method may further include a step of: recording start recorded area information to the information recording medium for identifying an area to which data is continuously recorded from a start position of a combined data area including the first data area and the second data area.

In the recording method according to an embodiment of the present invention, the recording method may further include a step of: recording reference recorded area information to the information recording medium for identifying an area to which data is continuously recorded from a reference position provided in the second data area.

Furthermore, the present invention provides a recording method for recording information to the information recording medium according to an embodiment of the present invention, the recording method including a step of: recording data for making the information recording medium compatible with a read only memory information recording medium by referring to the start recorded area information and the end recorded area information recorded to the management information area of the information recording medium.

Furthermore, the present invention provides a data structure of information for being recorded to the management information area in the information recording medium according to an embodiment of the present invention, the data structure includes: end recorded area information including information for identifying an area in the second data area having data that corresponds to an end position of the second data area.

Furthermore, the present invention provides an information recording apparatus for recording information to a disk-shaped rewritable information recording medium having at least a first recording layer provided with a first data area having a plurality of addresses allocated thereto and a second recording layer provided with a second data area having a plurality of addresses allocated thereto, the plural addresses of the first data area continuously increasing in a first direction, the plural addresses of the second data area continuously increasing in a second direction opposite to the first direction, the information recording apparatus including: a recording part for recording data to a designated recording layer among the recording layers of the information recording medium; a process apparatus for recording end recorded area information to the information recording medium via the recording part, the end recorded area information including information for identifying an area in the second data area having data that corresponds to an end position of the second data area.

In the information recording apparatus according to an embodiment of the present invention, the end recorded area information may be information related to an end position of an unrecorded area situated at a position in the second data area that is nearest to the end position of the second data area.

In the information recording apparatus according to an embodiment of the present invention, when dummy data is recorded to the second data area, the end recorded area information is updated in correspondence with the area to which the dummy data is recorded.

In the information recording apparatus according to an embodiment of the present invention, the first data area and the second data area may have logical addresses continuing from a start position of the first data area to an end position of the second data area.

In the information recording apparatus according to an embodiment of the present invention, the process apparatus may record start recorded area information to the information recording medium via the recording part, start recorded area information including information for identifying an area to which data is continuously recorded from a start position of a combined data area including the first data area and the second data area.

In the information recording apparatus according to an embodiment of the present invention, the start recorded area information may be information related to an end position of an area to which data is continuously recorded from the start position of the combined data area.

In the information recording apparatus according to an embodiment of the present invention, the end recorded area information may include information indicative of an end position of an area to which data is continuously recorded from a start position of the first data area in the first recording layer, and information indicative of an end position of an area to which data is continuously recorded from a start position of the second data area in the second recording layer.

In the information recording apparatus according to an embodiment of the present invention, the process apparatus may further record data for making the information recording medium compatible to a read only memory information recording medium via the recording part by referring to the start recorded area information and the end recorded area information recorded to the management information area of the information recording medium.

In the information recording apparatus according to an embodiment of the present invention, when the area identified by the start recorded area information is entirely included in the first data area, the process apparatus may record dummy data, via the recording part, to an unrecorded area situated between a position in the second data area situated at a same radial position as an end position identified by the start recorded area information and a start position identified by the end recorded area information.

In the information recording apparatus according to an embodiment of the present invention, the process apparatus may record a first intermediate area data to an area following the identified area in the first data area via the recording part and records a second intermediate area data to an area in the second data area situated at a same radial position as the intermediate area in the first data area via the recording part.

In the information recording apparatus according to an embodiment of the present invention, the process apparatus may obtain identification information including information for identifying an area in the second data area to which user data is recorded.

In the information recording apparatus according to an embodiment of the present invention, the identification information may further include information for identifying an unrecorded area in the first data area.

In the information recording apparatus according to an embodiment of the present invention, the process apparatus may further obtain identification information including information for identifying an area, following the area identified by the start recorded area information, to which user data is recorded.

In the information recording apparatus according to an embodiment of the present invention, when user data is recorded in the area identified by the end recorded area information, the process apparatus may record dummy data, via the recording part, to an unrecorded area situated between an end position of the area identified by the start recorded area information and a start position of the area identified by the end recorded area information.

In the information recording apparatus according to an embodiment of the present invention, the information recording apparatus may further include a formatting part for formatting the information recording medium, wherein the first and second data areas of the first and second recording layers are divided into a plurality of zones, wherein dummy data is recorded to the plural zones via the recording part and the information recording medium is formatted when there is no request for accessing the information recording medium.

In the information recording apparatus according to an embodiment of the present invention, the formatting part may obtain reference recorded area information including information for identifying an area to which data is continuously recorded from a reference position, wherein the reference position is a start position of one of the plural zones, wherein the one of the zones includes an end position of an unrecorded area situated adjacent to an area identified by the end recorded area information.

In the information recording apparatus according to an embodiment of the present invention, the start position of each zone may be set as a reference position, wherein area information is set in correspondence with the zones for identifying the area to which data is continuously recorded from the reference position, wherein the formatting part obtains the area information of one of zones as reference recorded area information, wherein the one of the zones includes an end position of an unrecorded area situated adjacent to an area identified by the end recorded area information.

In the information recording apparatus according to an embodiment of the present invention, in a case of where the formatting part records dummy data to the one of the zones in the second data area, the dummy data may be recorded to an unrecorded area situated between an end position of an area identified by the reference recorded area information and a start position of an area identified by the end recorded area information.

In the information recording apparatus according to an embodiment of the present invention, the process apparatus may further record the reference recorded area information to the information recording medium via the recording part.

In the information recording apparatus according to an embodiment of the present invention, the first direction of the first data area may be a direction oriented from an inner periphery of the information recording medium to an outer periphery of the information recording medium, wherein the second direction of the second data area is a direction oriented from the outer periphery of the information recording medium to the inner periphery of the information recording medium, wherein among the zone including the start position of the unrecorded area adjacent to the area identified by the start recorded area information and the zone including the end position of the unrecorded area adjacent to the area identified by the end recorded area information, the formatting part records dummy data from the zones situated toward the inner periphery of the information recording medium in a case where the end position of the area identified by the start recorded area information belongs to the first data area.

Furthermore, the present invention provides a program causing a computer of an information recording apparatus to record information to a disk-shaped rewritable information recording medium having at least a first recording layer provided with a first data area having a plurality of addresses allocated thereto and a second recording layer provided with a second data area having a plurality of addresses allocated thereto, the plural addresses of the first data area continuously increasing in a first direction, the plural addresses of the second data area continuously increasing in a second direction opposite to the first direction, the program including: a recording procedure for recording end recorded area information to the information recording medium, the end recorded area information including information for identifying an area in the second data area having data that corresponds to an end position of the second data area.

Furthermore, the present invention provides a computer readable medium including a program according to an embodiment of the present invention.

Other objects and further features of the present invention will be apparent from the following detailed description when read in conjunction with the accompanying drawings.

BRIEF DESCRIPTION OF DRAWINGS

FIGS. 7A-7B are drawings (Part 2) for describing a BGF process of a DVD+RW disk, respectively;

FIG. 8 is a table for describing management information of a DVD+RW disk;

FIG. 21 shows a table for describing another example (example 1) of management information that is recorded to a management information area;

FIG. 22 shows a table for describing another example (example 2) of management information that is recorded to a management information area;

FIG. 23 shows a table for describing another example (example 3) of management information that is recorded to a management information area;

FIG. 24 shows a table for describing another example (example 4) of management information that is recorded to a management information area;

FIGS. 26A-26B show tables for describing management information of the modified example of the BGF process shown FIGS. 25A-25C;

BEST MODE FOR CARRYING OUT THE INVENTION

Figure 1:
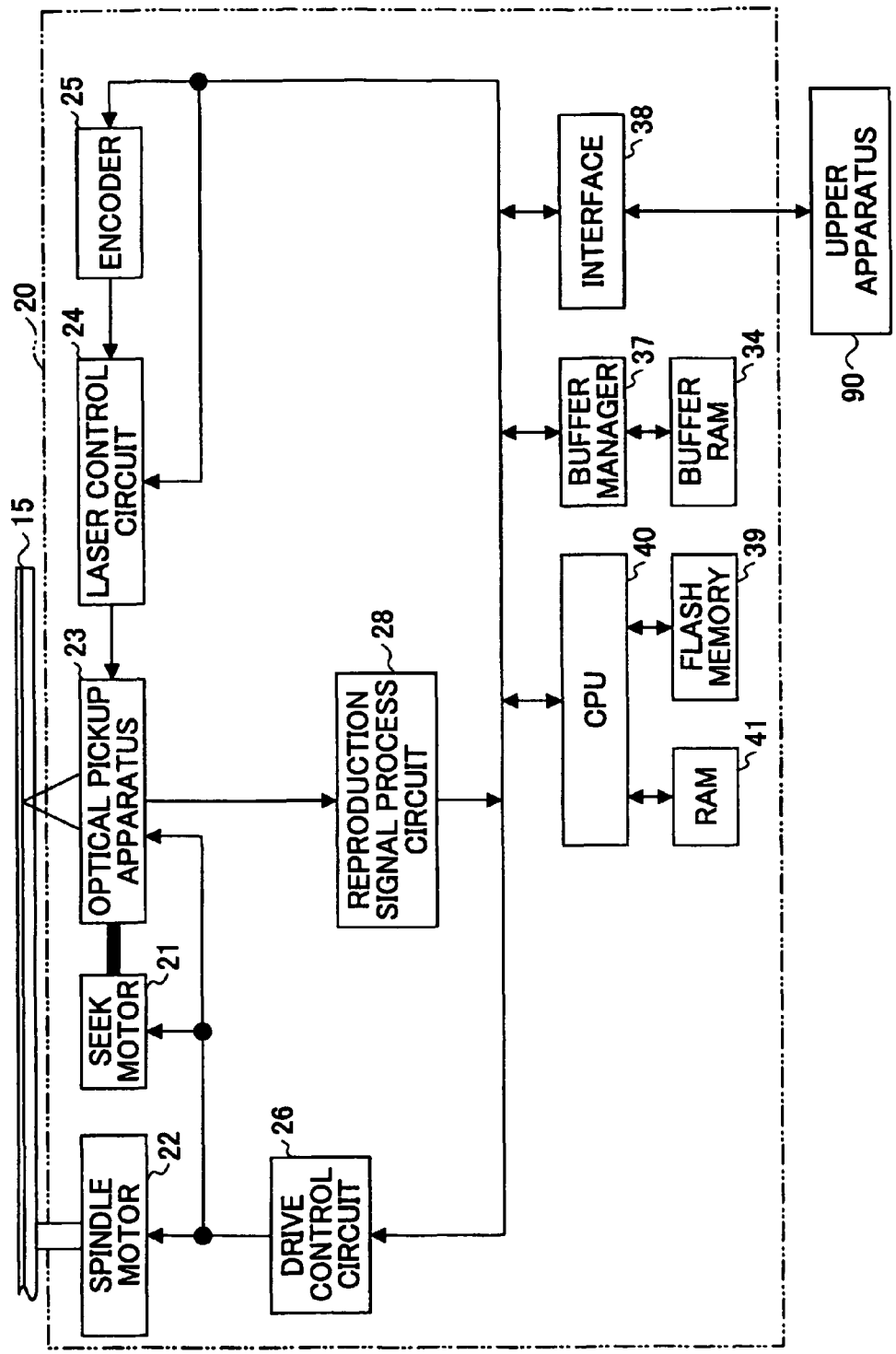
FIG. 1 is a block diagram showing a configuration of an optical disk apparatus according to an embodiment of the present invention.

The present invention is described in detail based on the embodiments illustrated in the drawings.

FIGS. 1-20 are drawings for describing an embodiment of the present invention. FIG. 1 is a block diagram showing a schematic configuration of an optical disk apparatus (information recording apparatus) 20 according to an embodiment of the present invention.

The optical disk apparatus 20 includes, for example, a spindle motor 22 for driving the rotation for an optical disk 15 serving as an information recording medium having multiple recording layers according to an embodiment of the present invention, an optical pickup apparatus 23, a seek motor 21 for driving the optical pickup apparatus 23 in a sledge direction, a laser drive circuit 24, an encoder 25, a drive control circuit 26, a reproduction signal process circuit 28, a buffer RAM 34, a buffer manager 37, an interface 38, a flash memory 39, a CPU 40, and a RAM 41. It is to be noted that the arrows shown in FIG. 1 merely illustrate the flow of representative signals and information and do not illustrate the entire connecting relation among each of the blocks.

The optical pickup apparatus 23 is an apparatus for condensing a laser beam on a target recording layer in the multiple recording layers of the optical disk 15 (a recording layer among the multiple recording layers of the optical disk 15 to which access is made, hereinafter referred to as "target recording layer") and for receiving light reflected from the target recording layer. Although not shown in the drawings, the optical pickup apparatus 23 includes, for example, an optic system including a semiconductor laser and an objective lens for guiding the light beam irradiated from the semiconductor laser to the target recording layer of the optical disk 15 and also guiding the light beam reflected from the target recording layer to a predetermined photo-detection area, a photodetector for receiving the reflected light beam, and a driving system (focusing actuator and tracking actuator). The photodetector includes multiple photo-detection elements (or photo-detection areas) which output signals to the reproduction signal process circuit 28 in correspondence with the amount of received light.

Based on the signals output from the photo-detection elements, the reproduction signal process circuit 28 obtains, for example, servo signals (focus error signals, tracking error signals, etc.), address information, synchronizing signals, and RF signals. The reproduction signal process circuit 28 outputs the obtained servo signals to the drive control circuit 26, the obtained address information to the CPU 40, the obtained synchronizing signals to the encoder and the drive control circuit 26, for example. Furthermore, the reproduction signal process circuit 28 performs, for example, a decoding process and an error detection process on the RF signals, and stores the processed RF signals (after an error correction process is performed in a case where an error is detected) as reproduction data in the buffer RAM 34 via the buffer manager 37.

Based on the tracking error signals obtained from the reproduction signal process circuit 28, the drive control circuit 26 generates drive signals for the tracking actuator in order to correct the deviation in the position of the objective lens with respect to the tracking direction. Furthermore, based on the focus error signals obtained from the reproduction signal process circuit 28, the drive control circuit 26 generates drive signals for the focusing actuator in order to correct the deviation of focus of the objective lens. The generated drive signals for both the tracking actuator and the focusing actuator are output to the optical pickup apparatus 23. Based on the generated drive signals, the optical pickup apparatus 23 performs tracking control and focus control. Furthermore, based on the commands from the CPU 40, the drive control circuit 26 also generates drive signals for driving the seek motor 21 and drive signals for driving the spindle motor 22. The generated drive signals for the seek motor 21 is output to the seek motor 21 and the generated drive signals for the spindle motor 22 is output to the spindle motor 22.

The buffer RAM temporarily stores, for example, data recorded in the optical disk 15 (recording data) and data reproduced from the optical disk 15 (reproduction data). The input and output of the buffer RAM 34 is managed by the buffer manager 37.

Based on the instructions of the CPU 40, the encoder 25 extracts recording data stored in the buffer RAM 34 via the buffer manager 37, conducts, for example, modulation of data and application of error correction codes, and generates write signals (signals for writing to the optical disk 15). The generated write signals are output to the laser control circuit 24.

The laser control circuit 24 controls the light emission power of the semiconductor laser in the optical pickup apparatus 23. For example, in a recording operation, the laser control circuit 24 generates drive signals for the semiconductor laser in accordance with, for example, the write signals, the recording conditions, and light emission properties of the semiconductor laser.

The interface 38 is a bidirectional communication interface for communicating with an upper apparatus 90 (for example, personal computer). The interface 38 complies to standard interfaces such as ATAPI (AT Attachment Packet Interface), SCSI (Small Computer System Interface), and USB (Universal Serial Bus).

The flash memory 39 stores, for example, various programs (including a program according to an embodiment of the present invention which is described in a code decodable for the CPU 40), recording conditions (including recording power, recording strategy information), and the light emission property of the semiconductor laser.

The CPU 40 controls the operation of the above-described components and parts in accordance with the program(s) stored in the flash memory 39 and stores data (e.g. data required for executing the control) in the RAM 41 and buffer RAM 34.

Next, a DVD-ROM is described as an example of a commercially available read only memory information recording medium. The DVD-ROM includes a single layer disk (also referred to as a "single layer DVD") having a single recording layer and a dual layer disk (also referred to as a "dual layer DVD") having two recording layers (also referred to as "Layer 0" and "Layer 1"). Furthermore, the dual layer DVD can be categorized according to track path (a path scanned in reproduction), in which there is a parallel track path (hereafter referred to as "PTP") type and an opposite track path (hereinafter referred to as "OTP") type.

Figure 2:
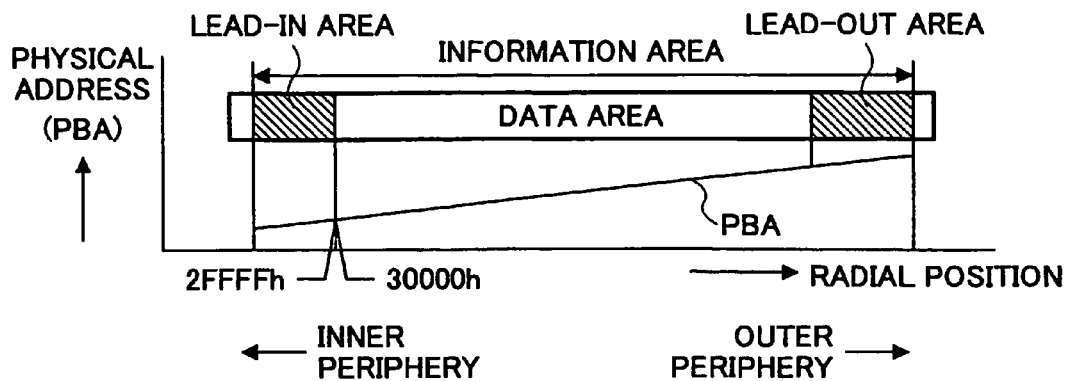
FIG. 2 is a drawing for describing a layout of an information area of a commercially available single layer DVD.

FIG. 2 shows a single layer DVD having an information area, in which the information area includes a lead-in area, a data area, and a lead-out area arranged in this order from the inner periphery of the disk to the outer periphery of the disk. Furthermore, physical addresses (PBA, Physical Block Address), which continuously (sequentially) increase, are allocated from the lead-in area to the lead-out area (i.e. inner periphery of the disk to the outer periphery of the disk) of the recording layer of the single layer DVD. Furthermore, the track path is oriented in a direction heading from the lead-in area to the lead-out area.

Figure 3:
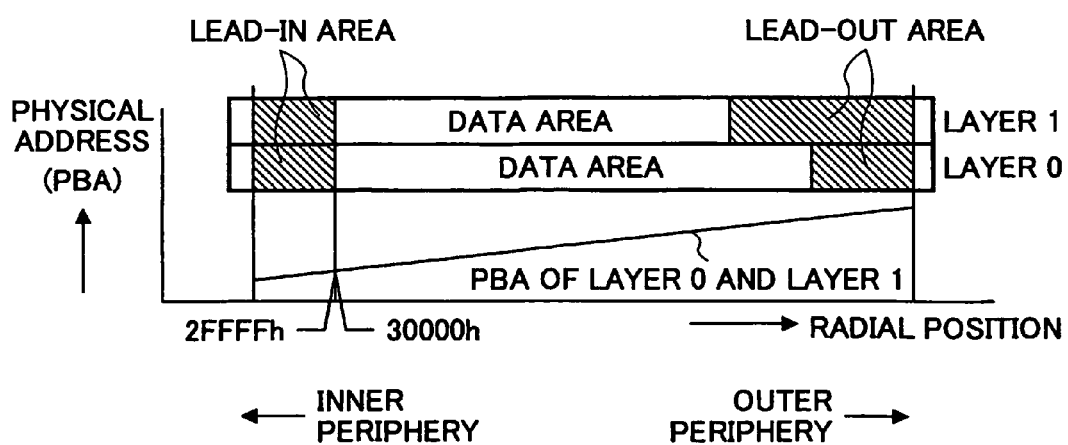
FIG. 3 is a drawing for describing a layout of an information area of a commercially available PTP type dual layer DVD.

FIG. 3 shows a PTP type dual layer DVD having an information area corresponding to each recording layer, in which the information area of each recording layer includes a lead-in area, a data area, and a lead-out area arranged in this order from the inner periphery of the disk to the outer periphery of the disk. That is, in the PTP type dual layer DVD having an information area in each recording layer, one recording layer is independent from the other recording layer. Furthermore, physical addresses, which continuously (sequentially) increase, are allocated from the lead-in area to the lead-out area (i.e. inner periphery of the disk to the outer periphery of the disk) of each recording layer of the dual layer DVD. Furthermore, the track path in each recording layer is oriented in a direction from the lead-in area to the lead-out area.

As shown in FIG. 3, the start position and the end position of the lead-in area of each recording layer, the start position of the data area of each recording layer, and the end position of the lead-out area of each recording layer are situated in the same radial position, respectively. On the other hand, the start position of the lead-out area of each recording layer (i.e. the end position of each recording layer) is different. In a case where the end position of the data area of each recording layer is different, lead-out information is recorded in the area of the difference (differential area). It is to be noted that the radial position according to an embodiment of the present invention is based on the rotation center of the disk. Furthermore, it is to be noted that "start position" refers to a position at which a least physical address of an area or a least logical address of an area is allocated, and "end position" refers to a position at which a greatest physical address of an area or a greatest logical address of an area is allocated.

Figure 4:
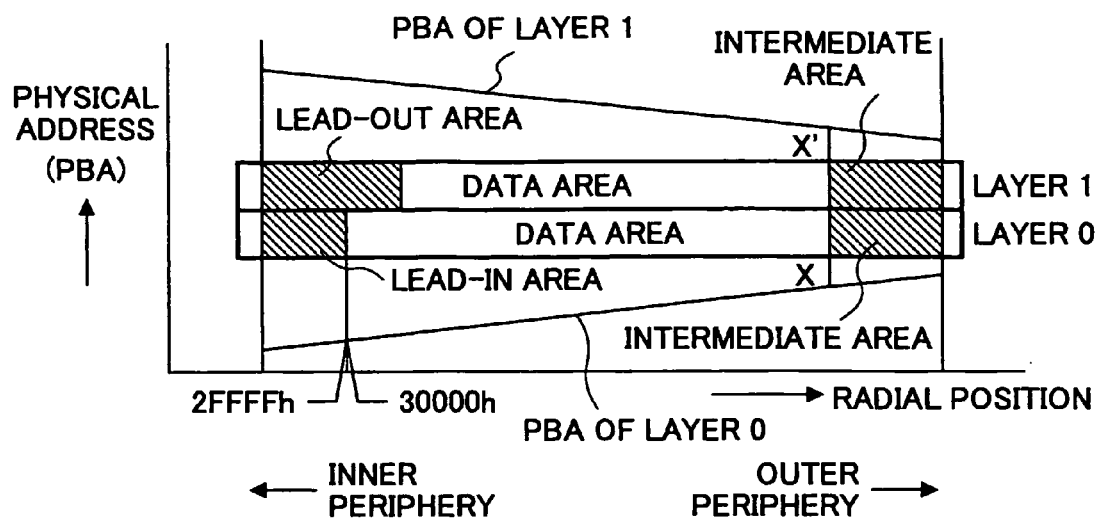
FIG. 4 is a drawing for describing a layout of an information area of a commercially available OTP type dual layer DVD.

FIG. 4 shows an OTP type dual layer DVD having a single information area, in which the information area in Layer 0 includes a lead-in area, a data area, and an intermediate area arranged in this order from the inner periphery of the disk to the outer periphery of the disk, and the information area in Layer 1 includes an intermediate area, a data area, a lead-out area arranged in this order from the outer periphery of the disk to the inner periphery of the disk. That is, the OTP type dual layer DVD has a single information area in which the recording layers are provided in continuation to form a single information area. Furthermore, physical addresses, which continuously increase, are allocated from the lead-in area to the intermediate area in Layer 0, and physical addresses, which are provided with inversed bits with respect to the physical addresses of Layer 0, are allocated from the intermediate area to the lead-out area in Layer 1. That is, physical addresses, which continuously increase, are allocated from the intermediate area to the lead-out area.

The track path of the OTP type dual DVD runs in a direction from the lead-in area of Layer 0 to the intermediate area, transfers to Layer 1 after reaching the intermediate area of the Layer 0, and continues to run in a direction from the intermediate area of Layer 1 to the lead-out area of Layer 1. In this case, Layer 0 and Layer 1 are handled as a single consecutive layer.

Furthermore, as shown in FIG. 4, the start position of the lead-in area in Layer 0 and the end position of the lead-out area in Layer 1, the end position of the data area in Layer 0 and the start position of the data area in Layer 1, and the start position and the end position of the intermediate layer of each recording layer are situated in the same radial position, respectively. On the other hand, the start position of the data area in Layer 0 and the end position of the data area in Layer 1 do not necessarily match. In this case, similar to the PTP type dual layer DVD, lead-out information is recorded in the area of the difference (differential area).

Next, a background format (hereinafter referred to as "BGF") process is described with reference to FIGS. 5-7B. A DVD+RW is used as an example of the information recording medium subject to the BGF process.

Figure 5:
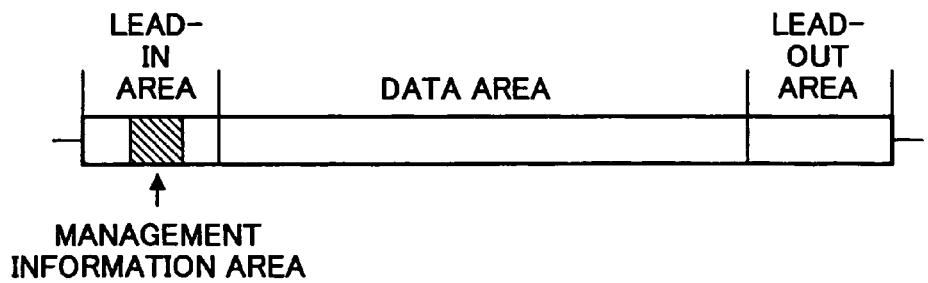
FIG. 5 is a drawing for describing a layout of an information area of a commercially available DVD+RW disk.

The DVD+RW has a recording layer which is basically the same layout as that of the single layer DVD-ROM. That is, the recording layer of the DVD+RW has an information area, in which the information recording area includes a lead-in area, a data area, a lead-out area arranged in this order from the inner periphery of the disk to the outer periphery of the disk. Furthermore, user data is recorded in the data area. As shown in FIG. 5, the lead-in area includes a management information area to which management information is recorded as characteristic information peculiar to the DVD+RW. The management information is used for managing, for example, the BGF process and the area recorded during the BGF process.

As shown in FIG. 8, the management information of the DVD+RW includes, for example, "identification ID", "restriction information for unknown identification ID", "drive ID", "update count", "format status", "last written address (LWA)", "last verified address (LVA)", "bitmap start address", "bitmap length", "disk ID", and "bitmap".

The "identification ID" includes identification ID of the management information. The "restriction information for unknown identification ID" includes information regarding drive apparatus operations which are to be restricted in a case where the identification ID is unknown. The restriction information includes, for example, "restriction of recording to the data area", and "restriction of formatting". The "drive ID" includes ID information for identifying the drive apparatus to which the management information is recorded. The "update count" includes the number of times that the management information was updated. The "format status" includes information regarding the state of the BGF process. The state of the BGF process includes, for example, "state before the formatting process", "state in the middle of (during) the formatting process", and "state after completion of the formatting process". The "last written address (LWA)" includes an end address of a data area at which data is continuously recorded from a start address of the data area. In a case where the BGF process is restarted, dummy data is recorded from the address following the address of the LWA. The "last verified address (LVA)" includes an end address of a data area at which data is continuously verified from a start address of the data area. In an area at which verification is not conducted, "00000000h" is recorded to this area. The "bit map start address" includes the address in the data area which corresponds to the first bit of the bitmap information. The "bitmap length" includes the size of the data area in which the recorded/unrecorded state is managed with bitmap information. The "bitmap" includes bitmap information.

In the BGF process where a user requests a formatting process, completion of the formatting process is reported to the user once a portion of a lead-in is recorded (i.e. after an initial process). That is, for the user, the formatting process will appear to be completed once the initial process is completed. Accordingly, once the initial process is completed, the user can record and/or reproduce data with respect to the entire data area. This enables user data to be recorded at a short time even when using a blank disk and thus improves usability for the user. It is to be noted that an end address of the lead-in area is set as the initial value of the LWA when the initial process is completed, as exemplarily shown in FIG.

6A. Furthermore, since the area of the data area is unrecorded, all the bit values in the bitmap information are set with a value of "1", that is, information indicating "unrecorded" is set in the bitmap information.

Figure 6A:
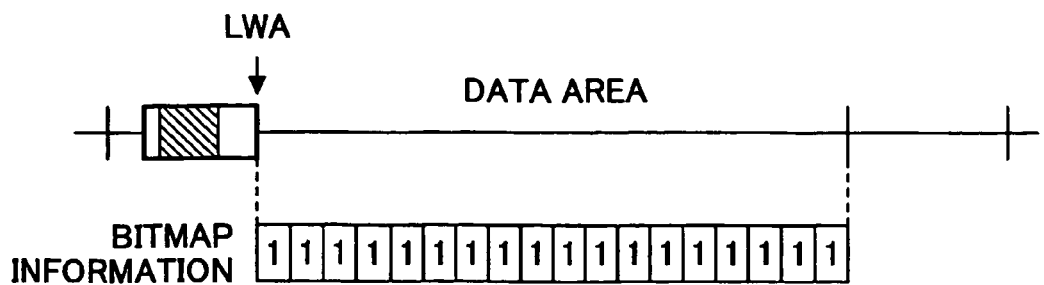
FIGS. 6A-6C are drawings (Part 1) for describing a BGF process of a DVD+RW disk, respectively.
Figure 6B:
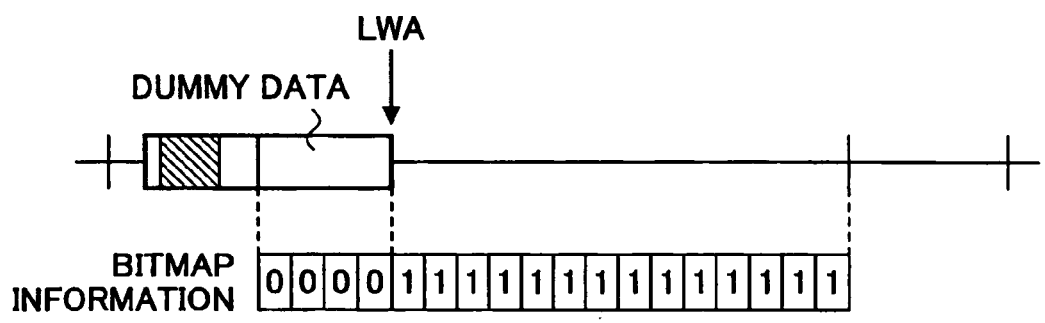
Figure 6C:
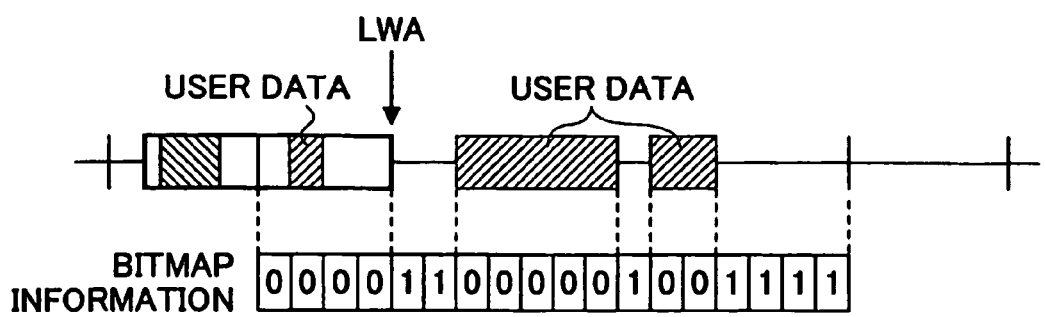

Then, by using a period where neither recording nor reproduction is requested by the user, dummy data is recorded in the unrecorded area of the data area from the inner periphery of the disk to the outer periphery of the disk, as exemplarily shown in FIG. 6B. In a BGF process for a DVD+RW, the process of recording dummy data is referred to as a "de-ice process". Since the de-ice process is executed continuously from the start position of the data area, the LWA is updated upon execution of the de-ice process. Furthermore, the bit values in the bitmap information corresponding to the area in which dummy data is recorded are set to 0, that is, the bitmap information is changed to information indicating "recorded" (See FIG. 6B).

In a case where the user requests recording of user data during the BGF process, the de-ice process is stopped (interrupted) and the recording of the user data is executed. Here, user data may be recorded in an unrecorded area(s), which is not yet subject to the de-ice process, owing that user data can be recorded in any area of the data area, as exemplarily shown in FIG. 6C. Then, as user data is recorded in the data area, the bit values in the bitmap information corresponding the area where the user data is recorded are changed to "0" (See FIG. 6C).

After the recording of user data is completed, the interrupted de-ice process is restarted. Upon restarting the de-ice process, reference is made to the LWA as the address for restarting the de-ice process. Thus, the unrecorded area of the data area is identified by referring to the bitmap information. Accordingly, dummy data is recorded to the unrecorded area following the LWA when the de-ice process is restarted, as exemplarily shown in FIG. 7A. Then, the LWA and the bitmap information are updated along with the recording of the dummy data. Therefore, with the updated bitmap information, the user data arranged behind the LWA can be prevented from being overwritten by dummy data when the de-ice process is restarted.

Furthermore, with a DVD+RW, the BGF process may be interrupted for ejecting the disk. In this case, although it is possible for the disk to be ejected where the data area of the disk includes a coexisting state of recorded areas and unrecorded areas, logical compatibility with the DVD-ROM cannot be ensured. This is due to the property of the DVD-ROM in which the information area including the lead-in area, the data area, and the lead-out area requires data to be recorded in the entire information area.

However, the DVD+RW can attain logical compatibility with the DVD-ROM by executing the following procedures.

First, dummy data is recorded in the unrecorded areas, which are intermittently arranged in the data area, by referring to the bitmap information. As a result, the LWA is updated as the end address of the recorded area situated at the outermost periphery of the disk. Then, a temporary lead-out (hereinafter referred to as "TLO") is recorded in the area arranged behind the LWA. Accordingly, an information area including a lead-in area, a data area (terminating at the LWA), and a (temporary) lead-out area is provided even in the middle of a formatting process (i.e. even when the formatting process is not completed); thereby enabling reproduction with a read only memory DVD drive apparatus (conventional drive apparatus). Generally, the data recorded to the data area has a different property (characteristic) compared to that of the data recorded to the lead-out area. In the DVD-RW, data indicative of the characteristic of the lead-out area is recorded as the TLO. It is to be noted that, since the bit values in the bitmap information corresponding to the TLO area remain unchanged with values of "1", the de-ice process can be restarted from the address following the LWA when the disk is reinserted in the drive apparatus. Then, TLO is overwritten with dummy data.

Next, the bitmap information is described in further detail. As described above, the BGF process allows user data to be recorded to any area in the data area when the initial process is completed. That is, user data can be recorded even to an area to which dummy data is not yet recorded in the de-ice process. Therefore, in a case where user data is recorded during the BGF process, unrecorded areas and recorded areas will coexist in the data area. In restarting the de-ice process in such state where the unrecorded areas and recorded areas coexist in the data area, it is necessary for dummy data to be recorded to an area in the data area where no user data is recorded. In order to fulfill this necessity, bitmap information is used. For example, in a case of a DVD+RW, the data area is virtually divided into areas of 1 ECC blocks (16 sectors, hereinafter referred to as "block areas") which serves a unit for recording, and a single block area is set to correspond to a single bit in the bitmap information. That is, a flag of 1 bit serves to distinguish whether the block area is in a recorded state and an unrecorded state. It is to be noted that FIGS. 6A-7B are, for the sake of convenience, illustrated so that 1 bit corresponds to multiple block areas. Thus, when user data is recorded to a block area in the data area, the bit value of the bitmap information corresponding to the block area where the user data is recorded is changed to a value of "0". Then, when the de-ice process is restarted, dummy data is recorded only to the unrecorded areas in the data area by referring to the bitmap information. Accordingly, user data recorded during the BGF process is prevented from being overwritten on dummy data.

Figure 9:
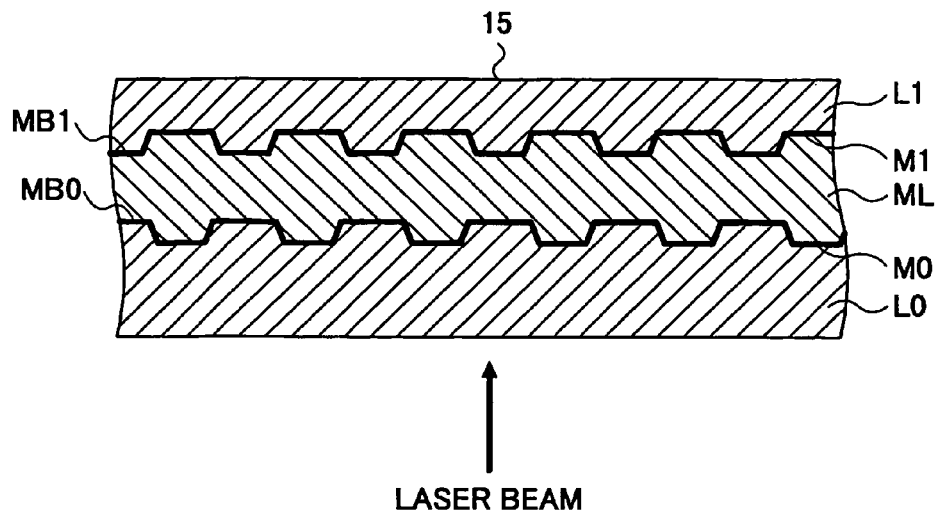
FIG. 9 is a drawing for describing a recording layer of an optical disk 15 shown in FIG. 1.

Next, the optical disk 15 according to an embodiment of the present invention is described. The optical disk 15 has the physical properties of a DVD type rewritable information recording medium. As shown in FIG. 9, the optical disk 15 includes a substrate L0, a recording layer M0 (first recording layer), an intermediate layer (ML), a recording layer M1 (second recording layer), a substrate L1 arranged in this order from the side where the light beam is incident. Furthermore, a translucent film MB0 formed of, for example, metal or a dielectric material is situated between the recording layer M0 and the intermediate layer ML. A reflection film MB1 formed of, for example, aluminum is situated between the recording layer M1 and the substrate L1. The intermediate layer ML uses an ultraviolet curing type resin material having high transmittancy with respect to the irradiated light beam and having a refractive index close to the refractive index of the substrate. It is to be noted that spiral or concentric tracks are formed in each recording layer. That is, the optical disk 15 is a single-sided dual layer rewritable disk.

Figure 10:
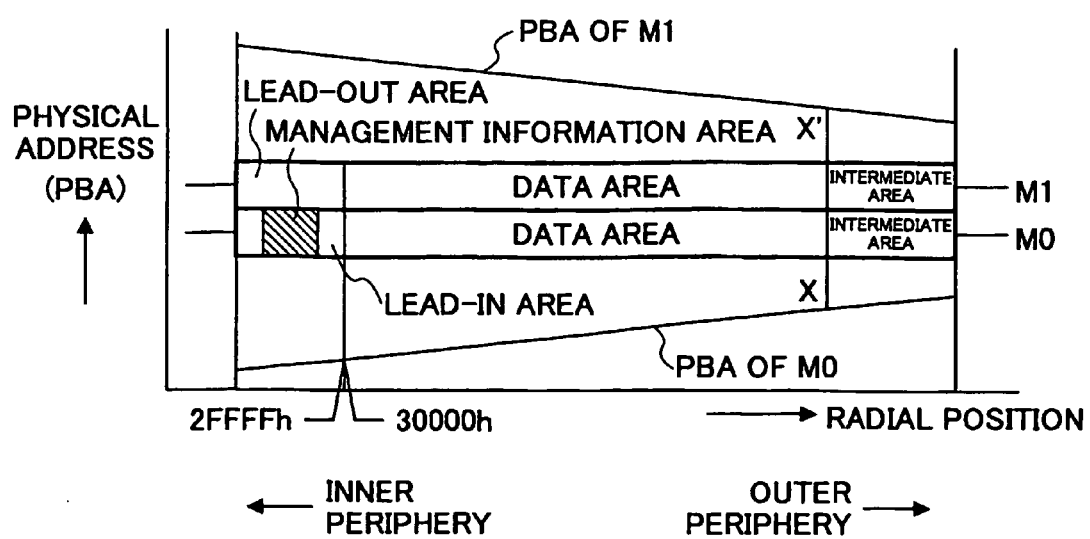
FIG. 10 is a drawing for describing a layout of an information area of the optical disk 15 shown in FIG. 1.

FIG. 10 shows a layout of an information area of the optical disk 15 which is the same as that of the OTP type optical disk. That is, the recording layer (first recording layer) M0 is provided with a lead-in area, a data area (first data area), and an intermediate area which are arranged in this order from the inner periphery of the optical disk 15 to the outer periphery of the optical disk 15. Furthermore, the recording layer (second recording layer) M1 is provided with an intermediate area, a data area (second data area), and a lead-out area which are arranged in this order from the outer periphery of the optical disk 15 to the inner periphery of the optical disk 15. Furthermore, physical addresses, which continuously increase, are allocated from the inner periphery of the disk to the outer periphery of the disk in the recording layer M1, and physical addresses, which continuously increase, are allocated from the outer periphery of the disk to the inner periphery of the disk in the recording layer M0. The term "preceding" hereinafter refers to the side toward the inner periphery of the disk in the recording layer M0, but refers to the side toward the outer periphery of the disk in the recording layer M1. Furthermore, the term "following" hereinafter refers to the side toward the outer periphery of the disk in the recording layer M0, but refers to the side toward the inner periphery of the disk in the recording layer M1.

Furthermore, the track path is scanned from the lead-in area of the recording layer M0 to the data area of the recording layer M0, and further towards the intermediate area of the recording layer M0. Then, after the intermediate area of the recording layer M0 is reached, the track path transfers to the recording layer M1. Then, the track path is scanned from the intermediate area of the recording layer M1 to the data area of the recording layer M1, and further towards the lead-out area of the recording layer M1. Here, the logical addresses continue from the start position of the data area of the recording layer M0 to the end position of the data area of the recording layer M1, so that the recording layers M0 and M1 are treated as a single recording layer. Therefore, according to this embodiment of the present invention, the data area of the recording layer M1 and the data area of the recording layer M0 are treated as a single continuous data area (combined data area, hereinafter referred to as "virtual data area" for the sake of convenience).

Figures 11, 12:
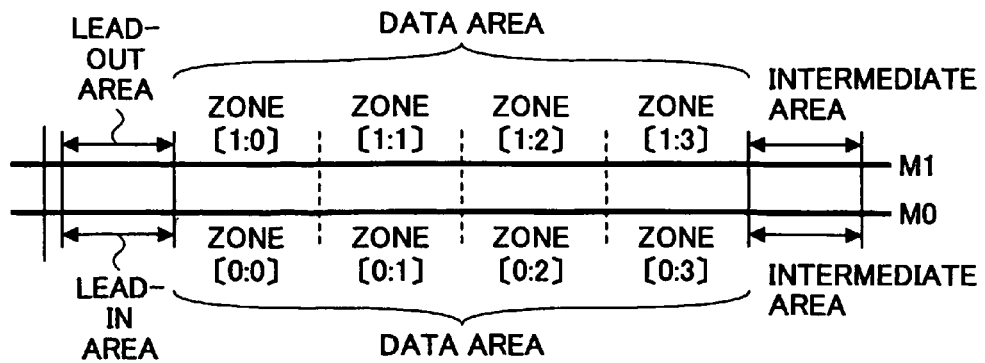
FIG. 11 is drawing for describing a zone of a data area of the optical disk 15 shown in FIG. 1.
FIG. 12 is a table for describing management information that is recorded to a management information area shown in FIG. 10.

According to an embodiment of the present invention, each recording layer is virtually divided into four zones (partial areas) starting from zone [N:0] to zone [N:3] (N indicates the number of the layer, N=0,1), as shown in FIG. 11. In this example, the recording layer M0 is denoted as layer number 0 and the recording layer M1 is denoted as layer number 1. Accordingly, the data area of the recording layer M0 is divided into zone [0:0], zone [0:1], zone [0:2] and zone [0:3], and the data area of the recording layer M1 is divided into zone [1:0], zone [1:1], zone [1:2], and zone [1:3]. In terms of the distance from the rotation center of the optical disk 15 (i.e. radial position), the end position of zone [0:0] and the start position of zone [1:0] are situated at the same position, the end position of zone [0:1] and the start position of zone [1:1] are situated at the same position, the end position of zone [0:2] and the start position of zone [1:2] are situated at the same position, and the end position of zone [0:3] and the start position of zone [1:3] are situated at the same position.

Furthermore, the optical disk 15 according to an embodiment of the present invention is formatted by performing the above-described BGF process on the optical disk 15. Then, the de-ice process is alternately performed on the zones of the recording layer M0 and the recording layer M1 from the inner periphery of the optical disk 15. In other words, the de-ice process is conducted in an order of zone [0:0]→zone [1:0]→zone [0:1]→zone [1:1]→zone [0:2]→ . . . →zone [1:3].

Furthermore, the lead-in area includes a management information area (information area) which stores management information for managing, for example, the BGF process and the areas recorded during the BGF process. As shown in FIG. 12, the management information in the optical disk 15 has a data structure including, for example, "identification ID", "restriction information for unknown identification ID", "drive ID", "update count", "format status", "last written address (LWA)" serving as start recorded area information, "last verified address (LVA)", "bitmap start address", "bitmap length", "disk ID", "last unwritten address (LUA)" serving as end recorded area information, "zone last written address" serving as reference recorded area information, and "bitmap" serving as identification information. Accordingly, the management information has a data structure including a data part for storing the LWA, a data part for storing the LUA, and a data part for storing the zone LWA. It is to be noted that the positions of the "last written address (LWA)", the "last unwritten address (LUA)", the "zone last written address (zone LWA)" and the "bitmap" are not to be limited to the aforesaid positions.

The "identification ID", the "restriction information for unknown identification ID", the "drive ID", the "update count", and the "format status" include the same information as the corresponding management information of the above-described DVD+RW.

According to an embodiment of the present invention, the "last written address (LWA)" (i.e. start recorded area information) serves as information for identifying the area where data is continuously (consecutively) recorded from the start position of the virtual data area, in which the end address of the continuously recorded data is stored therein. Accordingly, when data is entirely recorded to the data area of the recording layer M0 and data is further recorded to the recording layer M1, the LWA is updated to the address in the data area of the recording layer M1.

According to an embodiment of the present invention, the "last verified address (LVA)" includes the end address of the area where data is continuously verified from the start position of the virtual data area. Accordingly, when the entire area of the data area of the recording layer M0 is verified and the data is further verified with respect to the data area of the recording layer M1, the LVA is updated to the address in the data area of the recording layer M1. It is to be noted that, in an area at which verification is not conducted, "00000000h" is recorded to this area.

The "bitmap start address" according to an embodiment of the present invention includes the address in the virtual data area corresponding to the first bit in the bitmap information.

The "bitmap length" according to an embodiment of the present invention includes the size of the area in which recorded/unrecorded information in the virtual data area is managed according to bitmap information.

The "last unwritten address (LUA)" (i.e. end recorded area information) serves as information for identifying an area in the second data area having data that corresponds to an end position of the second data area. The LUA includes an end address of an area situated at an innermost part of the disk among unrecorded areas in data area of the recording layer M1.

The "zone last written address (zone LWA) (i.e. reference recorded area information) serves as information for identifying the area where data is continuously recorded from a predetermined reference position in the data area of the recording layer M1. The zone LWA includes the end address of the area to which data is continuously recorded from a start position (reference position) of a target monitor zone (zone in the data area of the recording layer M1 that is subject to monitoring). It is to be noted that if no information is continuously recorded from the start position of the target monitor zone, a start position of a target monitor zone is set to the zone LWA.

Figure 14A:
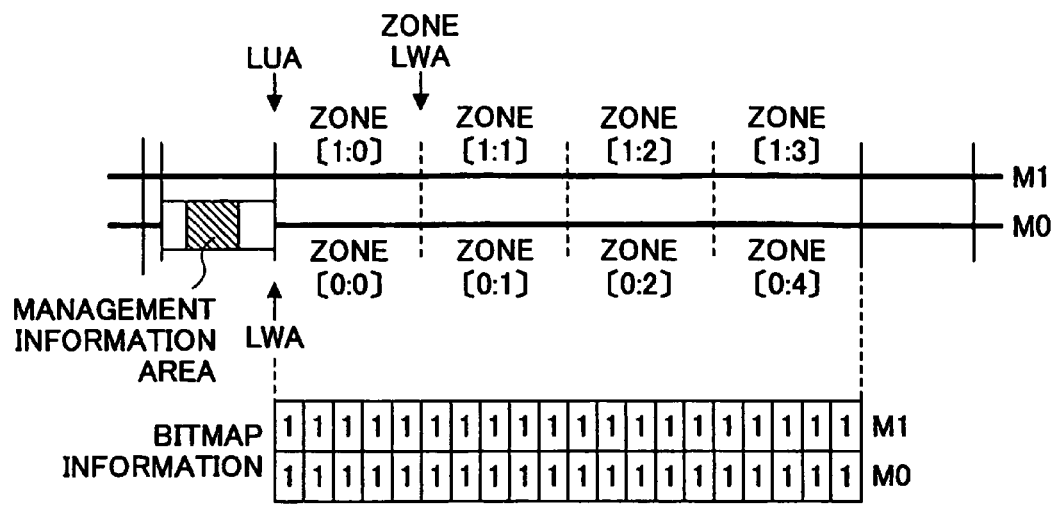
FIGS. 14A-14C are drawings (Part 1) for describing a BGF process of the optical disk apparatus shown in FIG. 1, respectively.

The "bitmap" according to an embodiment of the present invention includes bitmap information for determining (distinguishing) whether the data area of the recording layer M0 is an area having data recorded thereto and also determining (distinguishing) whether the data area of the recording layer M1 is an area having user data recorded thereto (See FIG. 14). In this example, the virtual data area is virtually divided into block areas in which each block area is an area of 1 ECC block (16 sectors). A single bit in the bitmap information corresponds to a single block area. It is to be noted that, FIGS. 14A-15C and FIGS. 18A-19B are, for the sake of convenience, illustrated so that 1 bit corresponds to multiple block areas. FIGS. 25A-25C and FIGS. 27A-28C are illustrated likewise.

[BGF Process]

Figure 16:
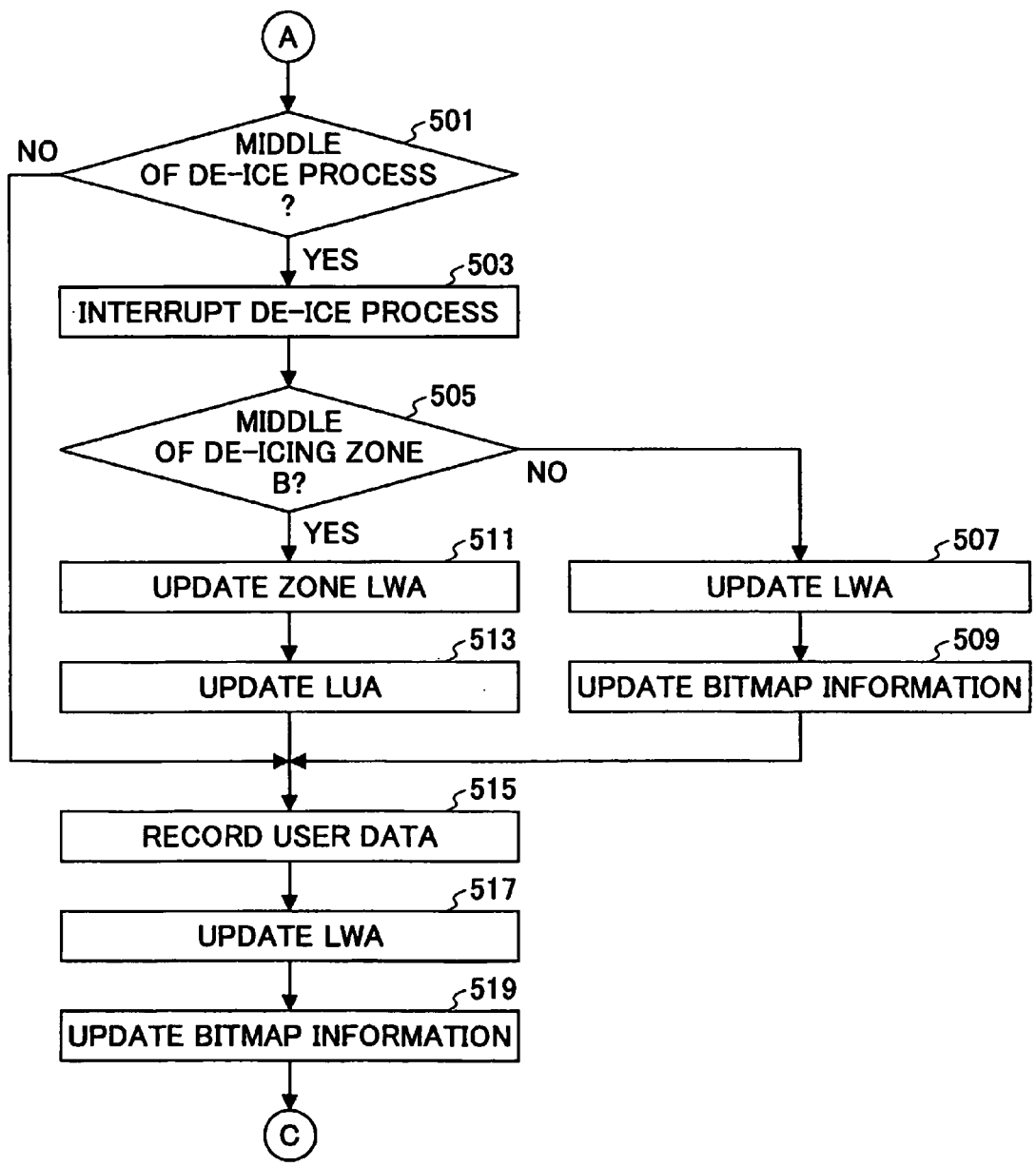
FIG. 16 is a flowchart for describing a process in a case where recording of user data is requested in the middle of a BGF process shown in FIG. 13.

Next, a process, which is executed when the above-described optical disk apparatus 20 receives a command requesting a formatting process from the upper apparatus 90, is described with reference to FIGS. 13, 16, and 17. The flowcharts shown in FIGS. 13, 16, and 17 correspond to a series of process algorithms executed by the CPU 40, respectively. In this example, the optical disk 15 may be a blank disk. Furthermore, at least one of the LWA, the LUA, and the zone LWA of the optical disk 15 may already have data recorded thereto. For example, in a case where at least one of the LWA, the LUA, and the zone LWA of the optical disk 15 already has data recorded thereto, at least one of the LWA, the LUA, and the zone LWA of the optical disk 15 is read out and stored in the RAM 41 when the optical disk 15 is set to the optical disk apparatus 20.

It is to be noted that, the optical disk apparatus 20 according to an embodiment of the present invention communicates with the upper apparatus 90 (both transmission and reception) in accordance with an interruption process. When the optical disk apparatus 20 receives a command requesting recording of data from the upper apparatus, the process of the optical disk apparatus 20 is interrupted to set a value of "1" to a recording request flag. When the optical disk apparatus 20 receives a command requesting ejection of the disk 15, the process of the optical disk apparatus 20 is interrupted to set a value of "1" to an ejection request flag. In this example, no reproduction of data is to requested by the upper apparatus 90 during the BGF process.

Figure 13:
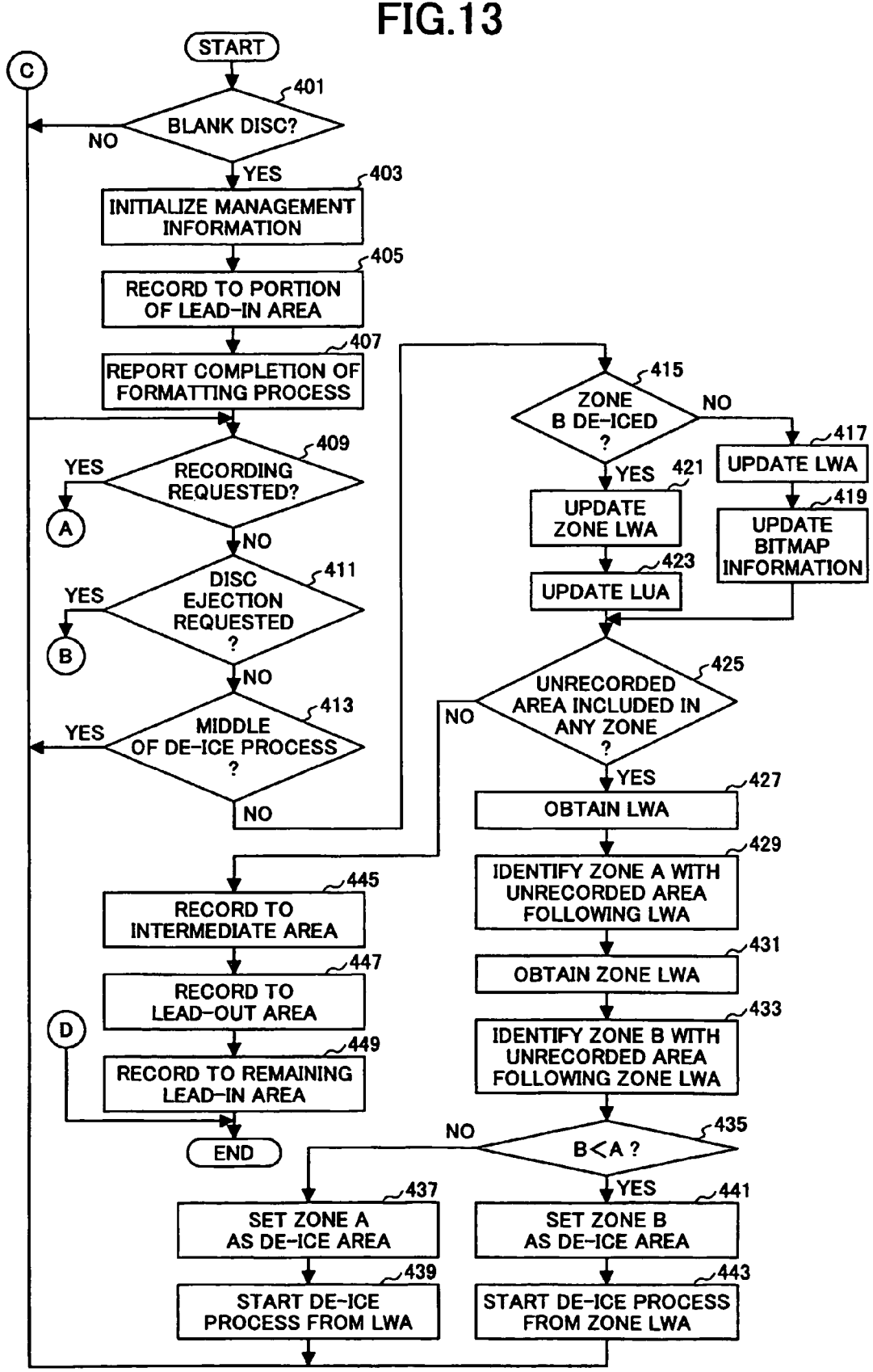
FIG. 13 is a flowchart for describing a BGF process of an optical disk apparatus shown in FIG. 1.

When the optical disk apparatus 20 receives a command requesting a formatting process, a start address of a program corresponding to the flowchart shown in FIG. 13 is set to a program counter of the CPU 40, to thereby start the BGF process. The recording request flag and the ejection request flag are set to a value of "0", respectively. It is to be noted that data is written (recorded) to the optical disk 15 via, for example, the encoder 25, the laser control circuit 24, and the optical pickup apparatus 23.

In Step 401, it is determined whether the optical disk 15 is a blank disk. If the optical disk 15 is a blank disk, an affirmative decision output. Then, the process proceeds to Step 403.

In Step 403, management information is initialized. That is, an area having a data structure which is the same as that of the management information of the optical disk 15 is obtained for the RAM 41 and a predetermined initial value is set. In this example, the end address of the lead-in area is set as the initial value in the LWA, and the end address of the data area of the recording layer M1 is set as the initial value in the LUA, as shown in FIG. 14A. Furthermore, the first target monitor zone of the recording layer M1 is zone [1:0], and the start address of zone [1:0] is set as the initial value in zone LWA. Furthermore, the initial value for all of the bits in the bitmap information is set with a value of "1".

Next, in Step 405, predetermined information is recorded to a portion of the lead-in area including the management information area of the optical disk 15.

Next, in Step 407, completion of the formatting process is reported to the upper apparatus 90. At this point, a portion of the lead-in area is in a recorded state, as shown in FIG. 14A.

Next, in Step 409, it is determined whether recording is requested by the upper apparatus 90 by referring to the recording request flag. If the recording request flag is "0", the recording request is determined as negative, and the process proceeds to Step 411.

In Step 411, it is determined whether ejection of the optical disk 15 is requested by the upper apparatus 90 by referring to the ejection request flag. If the ejection request flag is "0", the ejection request is determined as negative, and the process proceeds to Step 413.

In Step 413, it is determined whether the optical disk apparatus 20 is in the middle of performing a de-ice process. If the optical disk apparatus 20 is not in the middle of performing the de-ice process, the de-ice process is determined as negative, and the process proceeds to Step 415.

In Step 415, it is determined whether a de-iced zone is zone B. If the de-iced zone is not zone B, the de-iced zone is determined as negative, and the process proceeds to Step 417.

In Step 417, the LWA is updated. It is to be noted that, in a case where no de-ice is conducted (e.g. immediately after the initial process), the process in this step is skipped.

In Step 419, the bitmap information is updated. It is to be noted that, in a case where no de-ice is conducted (e.g. immediately after the initial process), the process in this step is skipped.

In Step 425, it is determined whether a zone including an unrecorded area exists in the virtual data area. If there is a zone including an unrecorded area in the virtual data area, the existence of the zone is determined as affirmative, and the process proceeds to Step 427.

In Step 427, the LWA stored in the RAM 41 is obtained.

In Step 429, a zone including an unrecorded area following the address indicated by the LWA is identified (in this example, zone A). In a case immediately after the initial process, zone [0:0] is identified as zone A.

Next, in Step 431, the zone LWA stored in the RAM 41 is obtained.

Next, in Step 433, a zone including an unrecorded area following the address indicated by the zone LWA is identified (in this example, zone B). In a case immediately after the initial process, zone [1:0] is identified as zone B. It is to be noted that, although zone A may be either a zone in the recording layer M0 or a zone in the recording layer M1, zone B is a zone only in the recording layer M1 since the zone LWA is set for a zone in the recording layer M1.

Next, in Step 435, it is determined whether zone B is situated more toward the inner periphery compared to zone A. In a case immediately after the initial process, the radial position of zone B is the same as that of zone A. Therefore, the position of zone B is determined as negative, and the process proceeds to Step 437.

In Step 437, the area for performing the de-ice process is set to zone A.

Next, in Step 439, a de-ice process is commenced from the address following the address indicated by the LWA. In the de-ice process, dummy data is recorded only to the unrecorded area(s) following the LWA. That is, dummny data is recorded by avoiding the area(s) where no user data is recorded. Then, the process returns to Step 409.

It is to be noted that, when the optical disk 15 is not a blank disk in Step 401, a negative determination is output, and the process proceeds to Step 409. That is, the initial process is skipped. In this case, management information of the optical disk 15 is already stored in the RAM 41.

Furthermore, when the optical disk apparatus 20 is in the middle of performing a de-ice process in Step 413, an affirmative determination is output, and the process returns to Step 409. That is, the de-ice process is continued.

Furthermore, when the zone B is the de-iced zone in Step 415, an affirmative determination is output, and the process proceeds to Step 421. In Step 421, the zone LWA is updated. Next, in Step 423, the LUA is updated, and the process proceeds to Step 425.

Furthermore, when zone B is situated more toward the inner periphery of the optical disk 15 compared to zone A in Step 435, an affirmative determination is output, and the process proceeds to Step 441. In Step 443, a de-ice process is commenced from the address following the address indicated by zone LWA. Then, the process returns to Step 409.

Furthermore, when there is no zone including an unrecorded area in the virtual data area in Step 425, the de-ice process in the virtual data area is complete. Thereby, an affirmative determination is output in Step 425, and the process proceeds to Step 445. In Step 445, predetermined information is recorded to the intermediate area of the recording layers M0 and M1, respectively.

Then, in Step 447, the lead-out area is recorded. It is to be noted that, it is possible that the lead-out area is already recorded before the completion of the de-ice process, for example, in a case where the disk is ejected in a mode compatible for a read only memory disk (described below). In this case, the process in Step 447 is skipped. Accordingly, information indicating whether the lead-out area is recorded (e.g. format status) may be stored in the management information beforehand, to thereby record data in the lead-out area in a case where no data is recorded in the lead-out area by referring to the management information.

Next, in Step 449, the remaining lead-in area is recorded. After Step 449, the BGF process is completed.

[Recording Process in the Middle of Performing BGF Process]

In Step 409, in a case where the recording request flag is "1", an affirmative determination is output, and the process proceeds to Step 501 (See FIG. 16) after the recording request flag is reset to "0". More specifically, the start address of a program corresponding to the flowchart shown in FIG. 16 (hereinafter referred to as "recording process program") is set to the program counter of the CPU 40. In this example, it is supposed that the de-ice process is in the middle of being performed in zone [1:0].

In Step 501, it is determined whether the de-ice process is in the middle of being performed. If the de-ice process is in the middle of being performed, an affirmative determination is output, and the process proceeds to Step 503.

In Step 503, the de-ice process is stopped (interrupted).

In Step 505, it is determined whether zone B is a zone which is in the middle of being de-iced. In this case, the user requested recording in the middle of performing the de-ice process on zone [1:0]. Therefore, an affirmative determination is output, and the process proceeds to Step 511.

Figure 14B:
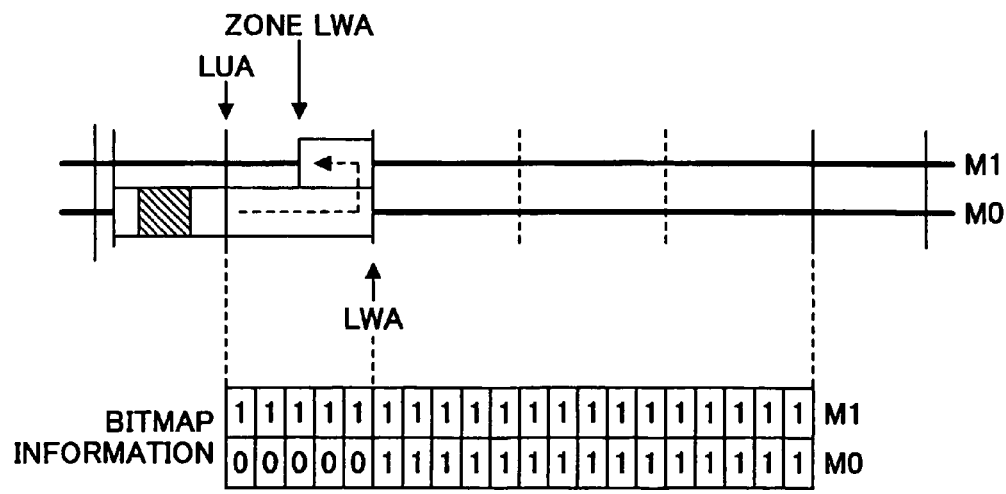

In Step 511, the zone LWA is updated. As shown in FIG. 14B, the end address of the area of zone [1:0] where dummy data is recorded becomes the new zone LWA.

Next, in Step 513, the LUA is updated. It is to be noted that, there is no change in the LUA since an unrecorded area exists in zone [1:0], as shown in FIG. 14B.

Next, in Step 515, user data is recorded. In this example, it is supposed that user data is continuously recorded from the middle of zone [0:0] to the middle of zone [0:1]. After the recording of user data is completed, the process proceeds to Step 517.

Figure 14C:
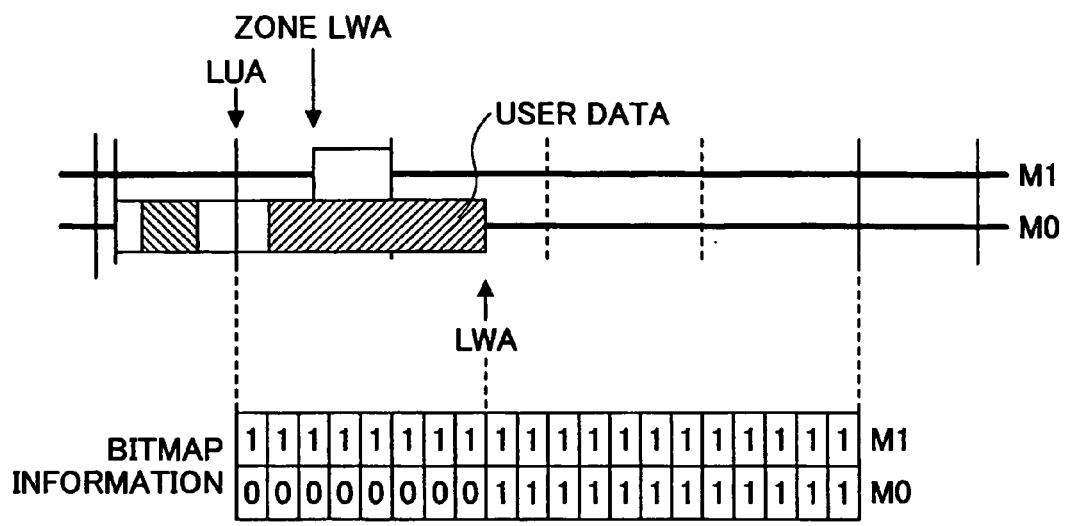

In Step 517, the LWA is updated. In this example, the end address of the area of zone [0:1] to which the user data is recorded becomes the new LWA, as shown in FIG. 14C.

Next, in Step 519, the bitmap information is updated. As shown in FIG. 14C, the bit values corresponding to the area of zone [0:1] to which user data is recorded is changed to "0". After Step 519, the recording process is completed, and the process returns to Step 409.

It is to be noted that, when zone B is not in the middle of being subject to the de-ice process in Step 505, a negative determination is output, and the process proceeds to Step 507.

In Step 507, the LWA is updated.

Next, in Step 509, the bitmap information is updated. After Step 509, the process proceeds to Step 515.

[Restart of De-Ice Process]

After the recording process is finished, the de-ice process is restarted. In this example, since zone B (zone [1:0]) is situated more toward the inner periphery compared to zone A (zone [0:1]), an affirmative determination is output in Step 435. Then, in Step 441, the area targeted for the de-ice process is set to zone B (in this example, zone [1:0]). Then, in Step 443, the de-ice process is restarted from the address following the address indicated in zone LWA.

Figure 15A:
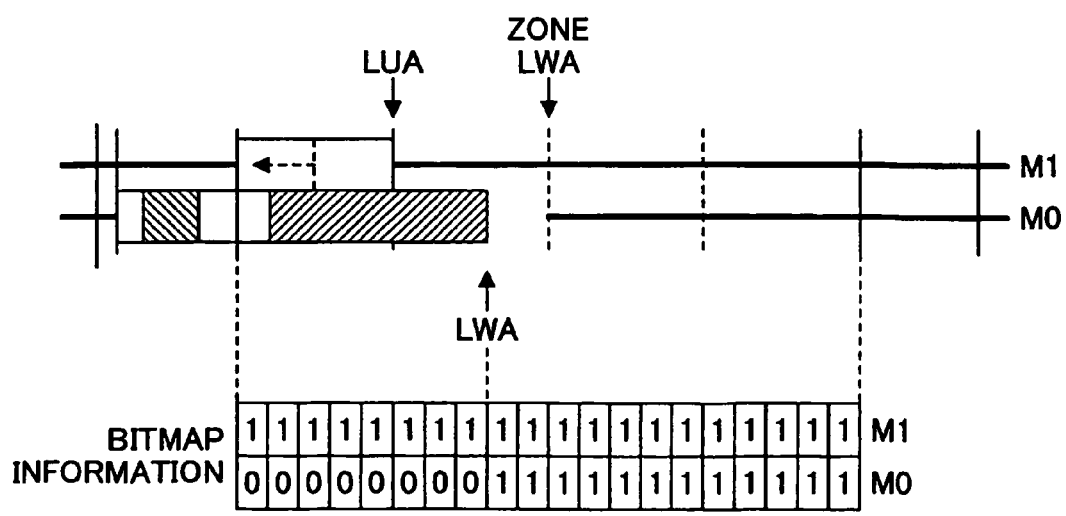
FIGS. 15A-15C are drawings (Part 2) for describing a BGF process of the optical disk apparatus shown in FIG. 1, respectively.
Figure 15B:
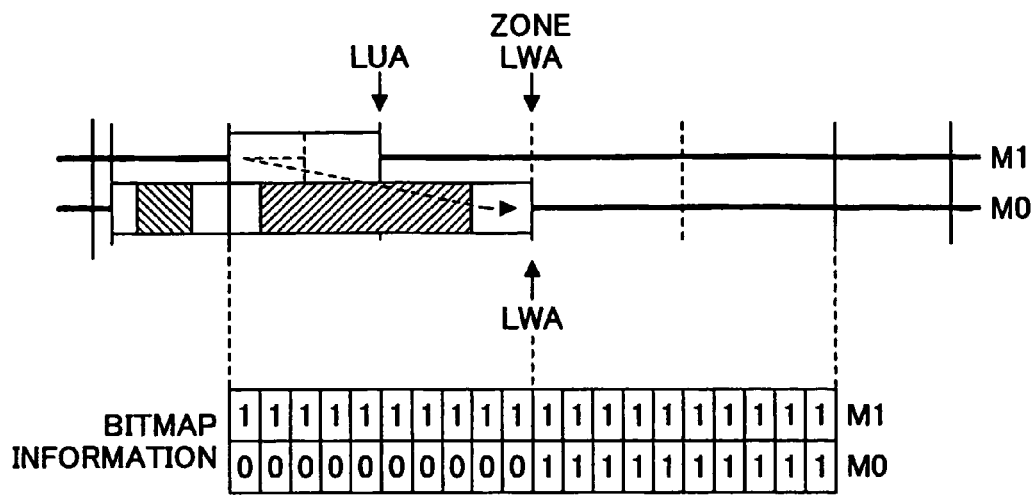

After the de-ice process is completed for zone [1:0], an affirmative determination is output in Step 415. Then, in Step 421, the target monitor zone in the recording layer M1 becomes zone [1:1], and the start address of zone [1:1] becomes the new zone LWA (See FIG. 15A). Then, in Step 423, the end address of zone [1:1] becomes the new LUA since there is no unrecorded area in zone [1:0]. That is, when dummy data is recorded in the data area of the recording layer M1, the LUA is updated in correspondence with the area to which the dummy data is recorded. Then, the unrecorded area of zone [0:1] becomes the next area targeted for the de-ice process. It is to be noted that, even when the de-ice process is completed for zone [1:0], the bit values of the bitmap information corresponding to zone [1:0] are not changed, as shown in FIG. 15A. Accordingly, in the de-ice process of the recording layer M1, the bit values of the bitmap information corresponding to the area to which dummy data is recorded does not change. In the recording layer M1, only the bit values of the bitmap information corresponding to the area to which user data is changed.

Figure 15C:
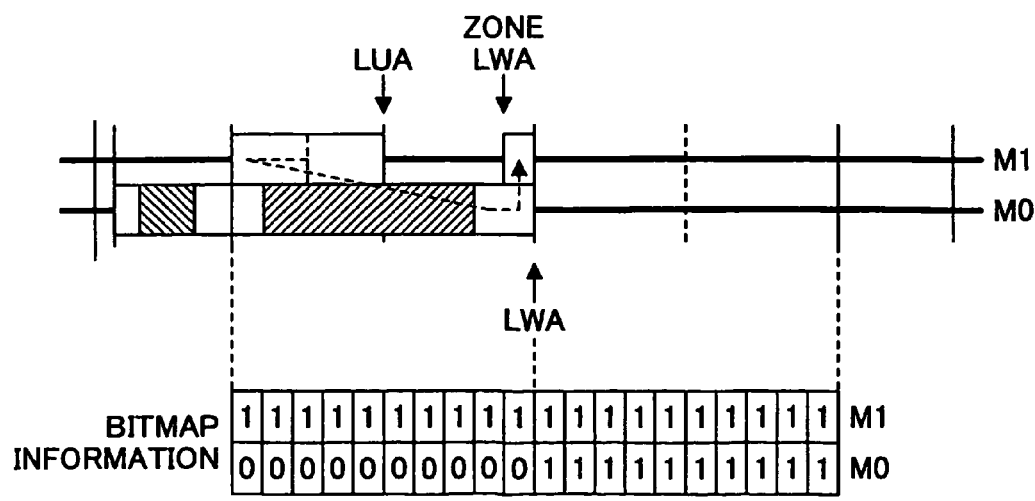

After the de-ice process for the unrecorded area in zone [0:1] is completed (See FIG. 15B), zone [1:1] becomes the next area targeted for the de-ice process (See FIG. 15C). In the de-ice process for recording layer M1, the dummy data is recorded and the LWA are updated. In addition, the bit values of the bitmap information corresponding to the area to which the dummy data are changed.

[Ejection Process in the Middle of the BGF Process]

Meanwhile, in Step 411, an affirmative determination is output if the ejection request flag is "1". Then, the process proceeds to Step 601 shown in FIG. 17. More specifically, the start address of a program corresponding to the flowchart shown in FIG. 17 (hereinafter referred to as "ejection process program") is set to the program counter of the CPU 40. It is to be noted that, in this example, the de-ice process is in the middle of being performed in zone [1:1].

In Step 601, it is determined whether the de-ice process is in the middle of being performed. If the de-ice process is in the middle of being performed, an affirmative determination is output, and the process proceeds to Step 603.

In Step 603, the de-ice process is stopped (interrupted).

Next, in Step 605, it is determined whether zone B is a zone which is in the middle of being de-iced. In this case, the user requested ejecting the optical disk 15 in the middle of performing the de-ice process for zone [1:1]. Therefore, an affirmative determination is output, and the process proceeds to Step 611.

Figure 18A:
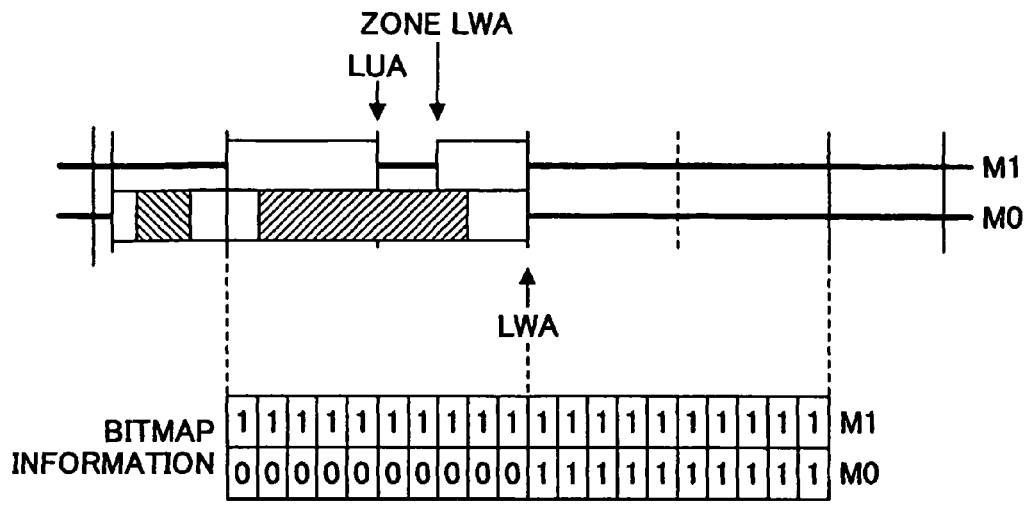
FIGS. 18A-18C are drawings (Part 1) for describing a process in a case where disk ejection is requested in the middle of the BGF process shown in FIG. 13; respectively.

In Step 611, the zone LWA is updated. In this example, the target monitor zone of the recording layer M1 is zone [1:1], and the zone LWA is changed to the end address of the area of zone [1:1] to which dummy data is recorded, as shown in FIG. 18A.

Next, in Step 613, the LUA is updated. In this example, the LUA is not changed since an unrecorded area exists in zone [1:1], as shown in FIG. 18A.

In Step 615, it is determined whether the user requests ejection of the disk in the mode compatible to a read only memory disk by referring to the disk ejection request command. If disk ejection is requested in the mode compatible for the read only memory disk, an affirmative determination is output, and the process proceeds to Step 617. Here, the mode compatible to the read only memory disk refers to a mode having logical compatibility to a read only memory disk (in this example, a single sided dual layer DVD-ROM).

In Step 617, an area having a largest end address among the areas to which user data is recorded is obtained by referring to the bitmap information. That is, among the areas where the bit values of the bitmap information are "0", the area having the largest end address is obtained. It is to be noted that, even when user data is recorded in a de-iced area in the recording layer M1 (area to which dummy data is recorded), the area to which dummy data is recorded and the area to which user data is recorded can be clearly distinguished by referring to the bitmap information.

Next, in Step 619, it is determined whether user data is recorded in the area behind the LWA based on the results obtained in Step 617. In this example, a negative determination is output since the area behind the LWA has no user data recorded thereto, and the process proceeds to Step 627.

Next, in Step 627, a corresponding position in the data area of the recording layer M1 situated in the same radial position as that of the end position of the recorded data area (i.e. data area in the recording layer M0 to which user data or dummy data is recorded) is obtained by referring to the zone LWA and the LUA. In this example, the start position of zone [1:1] is the corresponding position.

Next, in Step 629, it is determined whether an unrecorded area exists in the area following the corresponding position. In this example, an affirmative determination is output since an unrecorded area exists in zone [1:1], as shown in FIG. 18A. Then, the process proceeds to Step 631.

Figure 18B:
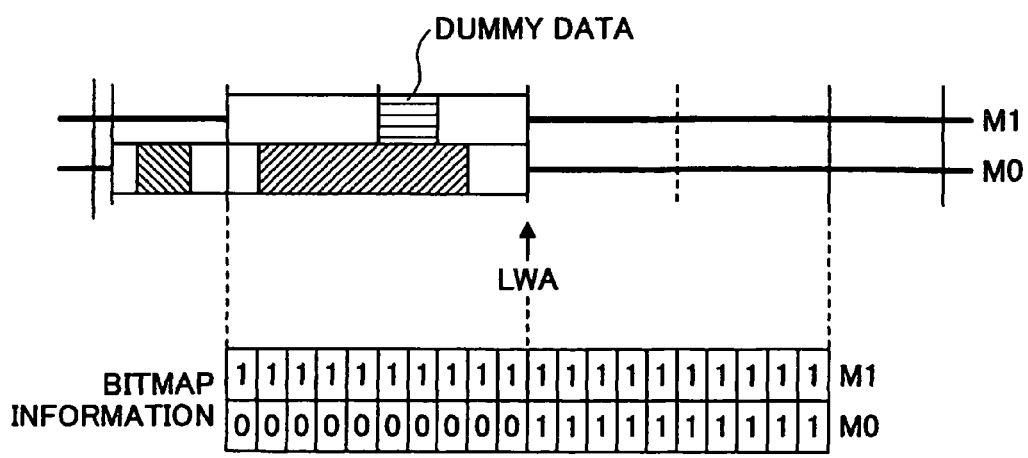

In Step 631, dummy data is recorded in the unrecorded area following the corresponding position. In this example, dummy data is recorded to zone [1:1], as shown in FIG. 18B. Accordingly, the target monitor zone in the recording layer M1 becomes zone [1:2].

Figure 18C:
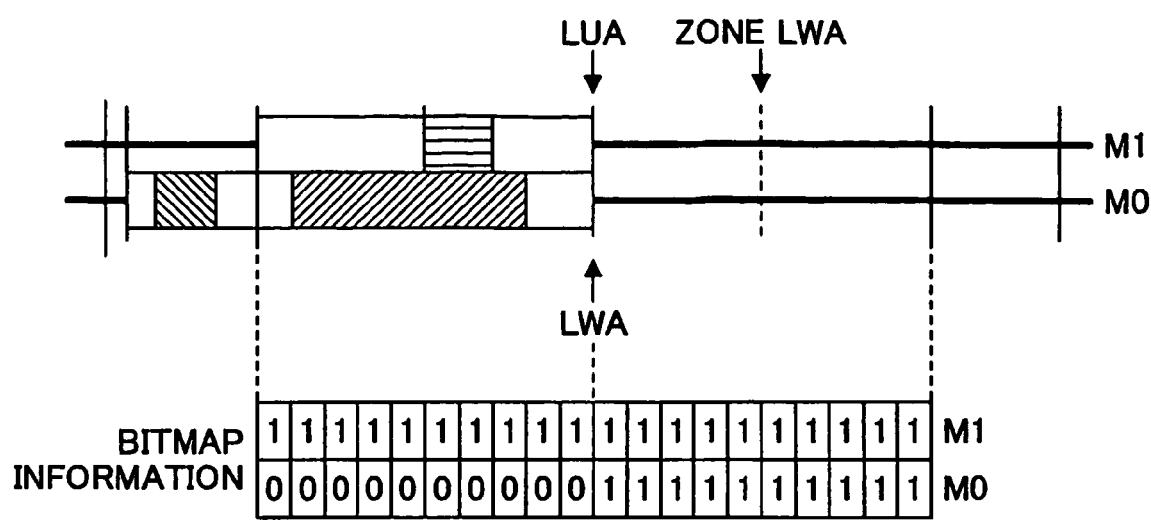

Next, in Step 633, zone LWA is updated. In this example, the target monitor zone in the recording layer M1 is zone [1:2], and the start address of zone [1:2] becomes the new zone LWA, as shown in FIG. 18C.

In Step 635, the LUA is updated. In this example, the end address of zone [1:2] becomes the new LUA, as shown in FIG. 18C.

Figure 19A:
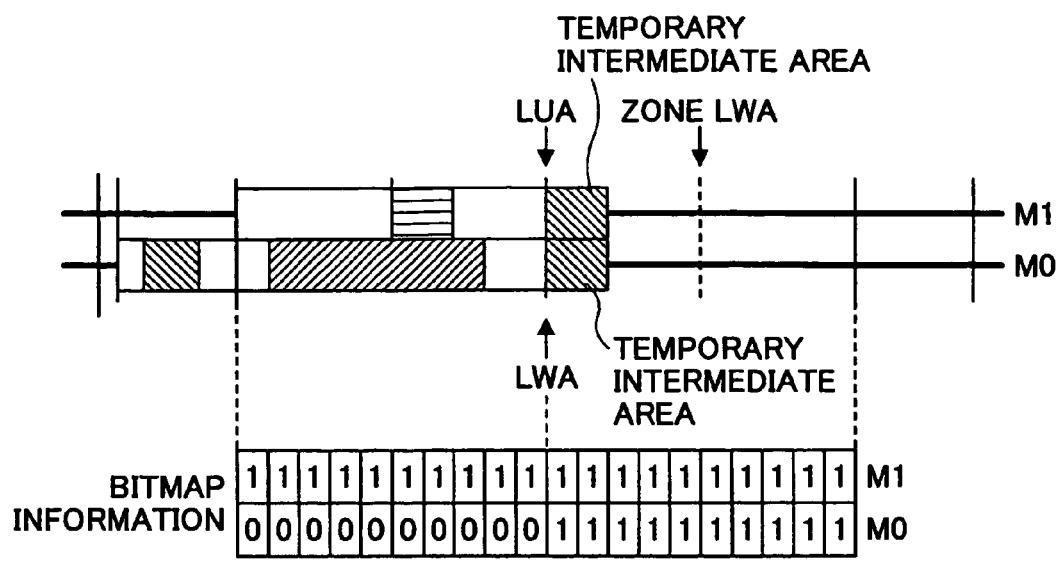
FIGS. 19A-19B are drawings (Part 2) for describing a process in a case where disk ejection is requested in the middle of the BGF process shown in FIG. 13; respectively.

In Step 637, data is recorded to a temporary intermediate area between the area following the LWA of the recording layer M0 and the area preceding the LUA of the recording layer M1. The data recorded in the temporary intermediate area has a property (characteristic) for indicating that the area is a temporary intermediate layer. It is to be noted that, the bit values of the bitmap information corresponding to the temporary intermediate layer remain as "1", as shown in FIG. 19A. This allows dummy data or user data to be overwritten on the temporary intermediate layer when the BGF process is restarted.

Figure 19B:
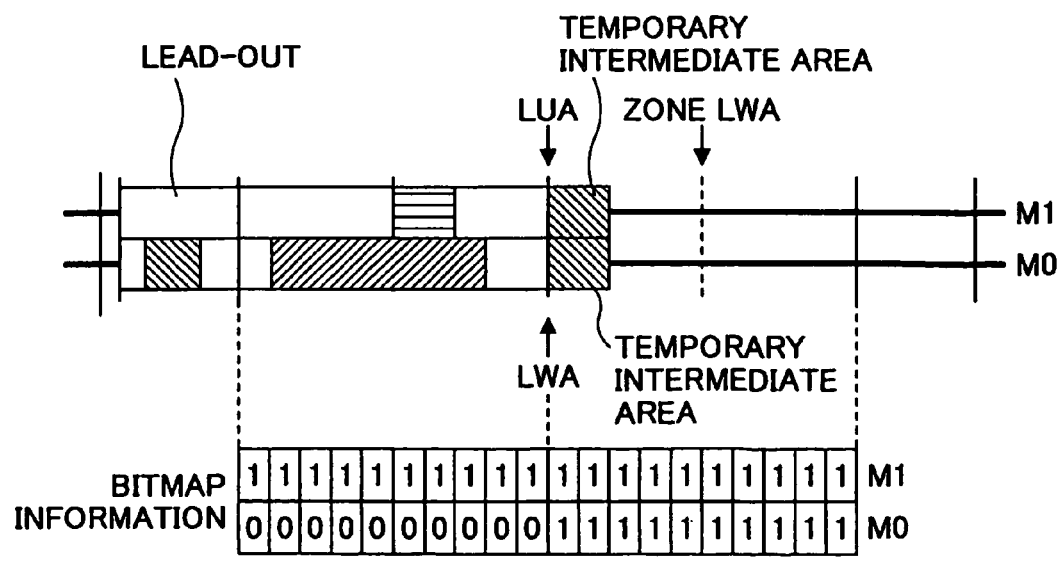

Next, in Step 639, data is recorded to the lead-out area, as shown in FIG. 19B. Hence, an information area is formed having a lead-in area, a data area to which data of the recording layer M0 is recorded, a (temporary) intermediate area, a data area to which data of the recording layer M1 is recorded, and a lead-out area, to thereby attain logical compatibility with an OTP type single sided dual layer DVD-ROM. It is to be noted that the process in Step 639 is skipped if the lead-out is already recorded.

Next, in Step 641, management information is recorded to the management information area of the optical disk 15. That is, information, for example, the LWA, the LUA, the zone LWA, and the bitmap information are recorded to the optical disk 15. It is to be noted that, the management information can be read out again and stored in the RAM 41 when the optical disk 15 is reset (reinserted) to the optical disk apparatus 20, and used for performing, for example, the BGF process.

Next, in Step 643, the optical disk 15 is ejected via a disk ejection mechanism (not shown), thereby the process is completed.

It is to be noted that when it is determined that the optical disk apparatus 20 is not in the middle of performing the BGF process in Step 601, a negative determination is output, and the process proceeds to Step 615.

Furthermore, when it is determined that zone B is not in the middle of being de-iced in Step 605, a negative determination is output, and the process proceeds to Step 607.

In Step 607, the LWA is updated.

In Step 609, the bitmap information is updated. Then, the process proceeds to Step 615.

In Step 615, when ejection of the disk is not requested in the mode compatible to the read only memory disk, a negative determination is output, and the process proceeds to Step 641.

Furthermore, in Step 619, when user data is recorded in an area following the LWA in the recording layer M0, an affirmative determination is output, and the process proceeds to Step 621.

In Step 621, dummy data is recorded to the unrecorded area existing between the LWA and the area having the largest end address among the area to which user data is recorded.

In Step 623, the LWA is updated.

In Step 625, the bitmap information is updated. Then, the process proceeds to Step 627.

Furthermore, in Step 629, when there is not unrecorded area following the corresponding position, a negative determination is output, and the process proceeds to Step 637.

[Logical Address]

Next, the logical address of the data area of each of the recording layers is described. The logical address is an address associated to the address of recorded data. Accordingly, the user requests a recording process by designating the logical address. Furthermore, information of the recorded position of the user data (e.g. file) recorded in the data area (e.g. file information) is stored in a predetermined file management area in the data area along with the corresponding logical address.

Figure 20A:
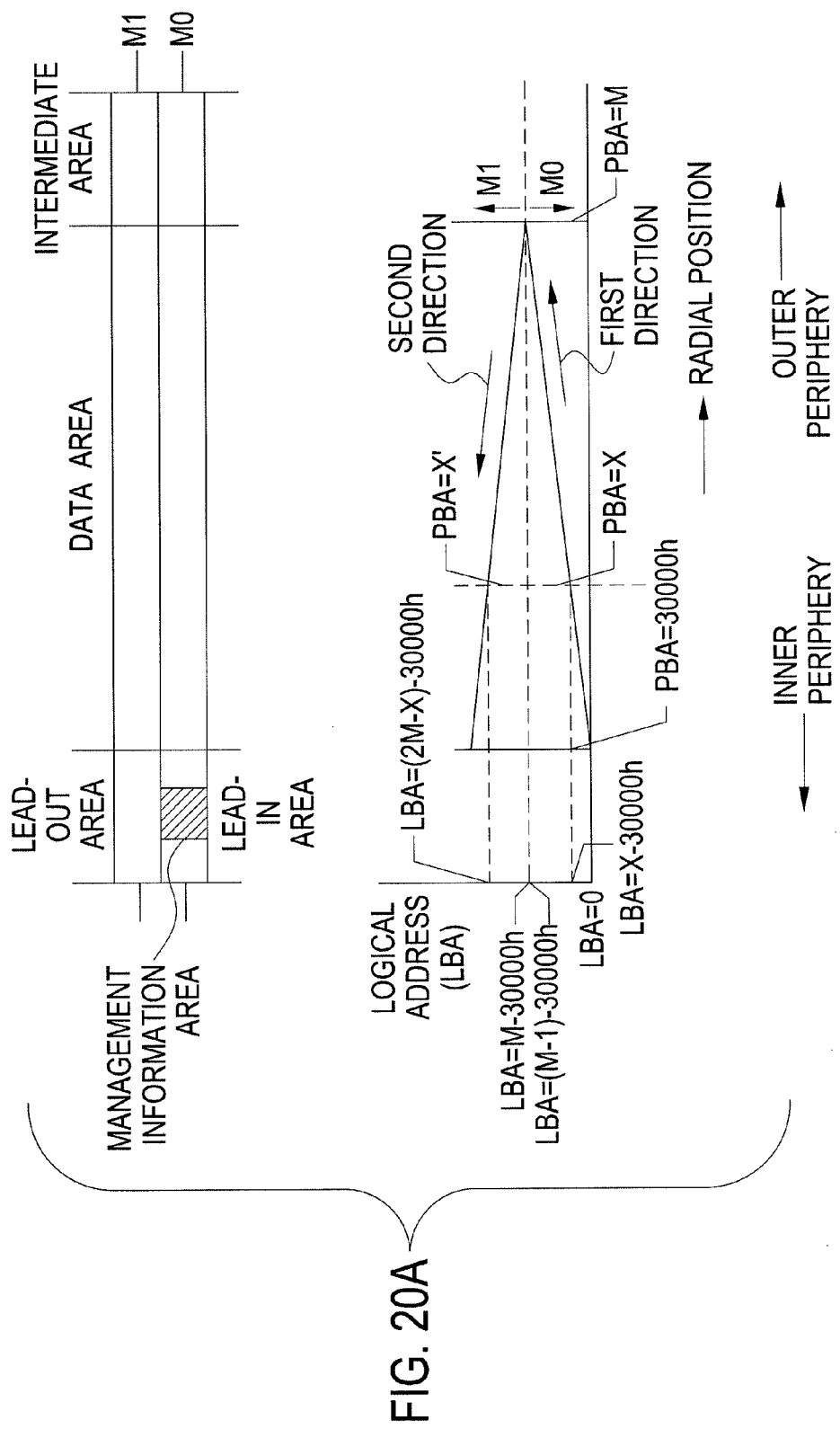
FIGS. 20A-20B are drawings for logical addresses, respectively.

FIG. 20A shows a relation between the layout of the information area of the optical disk 15 and its logical address (LBA) in a state where the de-ice process of the optical disk 15 is completed. The logical address is deemed to be the physical address (PBA) of the start position of the virtual data area. That is, the sector having a physical address "30000h" as the start position in the data area of the recording layer M0 is deemed as logical address "000000h". Furthermore, the logical address is allocated continuously from the start position in the data area of the recording layer M0 toward the outer periphery of the optical disk 15. As shown in FIG. 20A, in case where the physical address of the start position in the intermediate area in the recording layer M0 is indicated as "M", the logical address at the end position of the data area in the recording layer M0 becomes (M−1)−30000h. Further, the logical address continues from the end position of the data area in the recording layer M0 to the start position of the data area in the recording layer M1. Accordingly, the logical address of the start position of the data area in the recording layer M1 becomes M−30000h. Then, the logical address continuously increases from the start position of the data area in the recording layer M1 toward the inner periphery of the optical disk 15. It is to be noted that, the logical address is set in an initial state in a likewise manner even in a case where the entire disk is in an unrecorded state or in a case where data is not yet recorded in the intermediate area in the middle of a BGF process. In this example, the physical address X' indicates an address having an inversed bit value with respect to the physical address X.

Figure 20B:
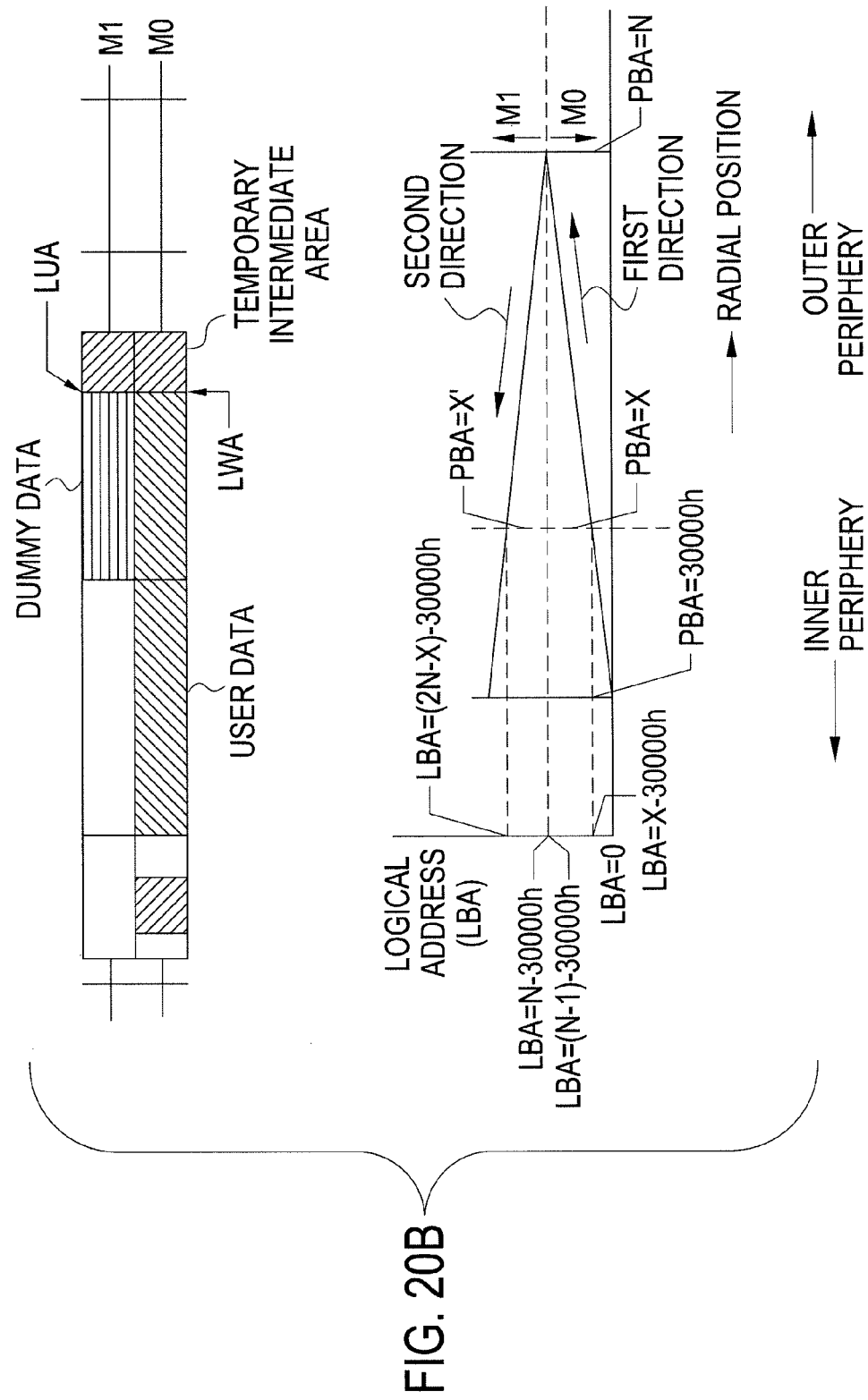

Next, FIG. 20B shows a relation between the layout of the information area of the optical disk 15 and its logical address in a state where the optical disk 15 is ejected after interrupting the BGF process. This example shows a state of obtaining logical compatibility with a single sided dual layer DVD-ROM by recording dummy data in the unrecorded area following the corresponding position in the recording layer M1 and recording data in the temporary intermediate area and the lead-out area. Same as the example shown in FIG. 20A, the start position of the data area in the recording layer M0 is deemed as logical address of "000000h". The logical address increases continuously in the data area in the recording layer M0 toward the outer periphery of the optical disk 15. In a case where the physical address of the start position in the temporary intermediate area is N (<M), the logical address of the end position of the data area in the recording layer M0 becomes (N−1)−30000h, and the logical address of the start position of the data area in the recording layer M1 becomes N−30000h. Then, the logical address increases continuously from the start position of the data area in the recording layer M1 toward the inner periphery of the optical disk 15.

With reference to FIGS. 20A and 20B, even if the radial position is the same, the logical address of the recording layer M1 of FIG. 20A is different from the logical address of the recording layer M0 of FIG. 20B. For example, with respect to physical address X in the recording layer M0, the logical addresses corresponding to the radial position of FIGS. 20A and 20B are both X−30000h. However, with respect to recording layer M1, the logical address corresponding to the radial position is (2M−X)−30000h in FIG. 20A, and the logical address corresponding to the radial position is (2N−X)−30000h in FIG. 20B. In other words, the logical address of the recording layer M1 differs depending on the size of the data area in the recording layer M0 to which data is recorded. That is, the logical address of the recording layer M1 differs depending on the position of the intermediate area.

Hence, in the optical disk apparatus 20 according to an embodiment of the present invention, a recording part according to an embodiment of the present invention is configured having an optical pickup apparatus 23, a laser control circuit 24, and an encoder 25 provided thereto. Furthermore, a process apparatus and a formatting part according to an embodiment of the present invention is configured having the CPU 40 and a program (executed by the CPU 40) provided thereto. That is, the process apparatus is realized by executing the steps 617-641 in FIG. 17, and the format part is realized by executing the steps 401-445 in FIG. 13.

It is to be noted that, the aforementioned process apparatus and format part may have a configuration that is partly or entirely provided in the form of hardware.

The program according to an embodiment of the present invention includes the ejection program among the programs recorded in the flash memory 39 (recording medium). That is the program corresponding to the process shown in Step 641 of FIG. 17 includes an operation (function) of recording the last unwritten address (LUA).

Figure 17:
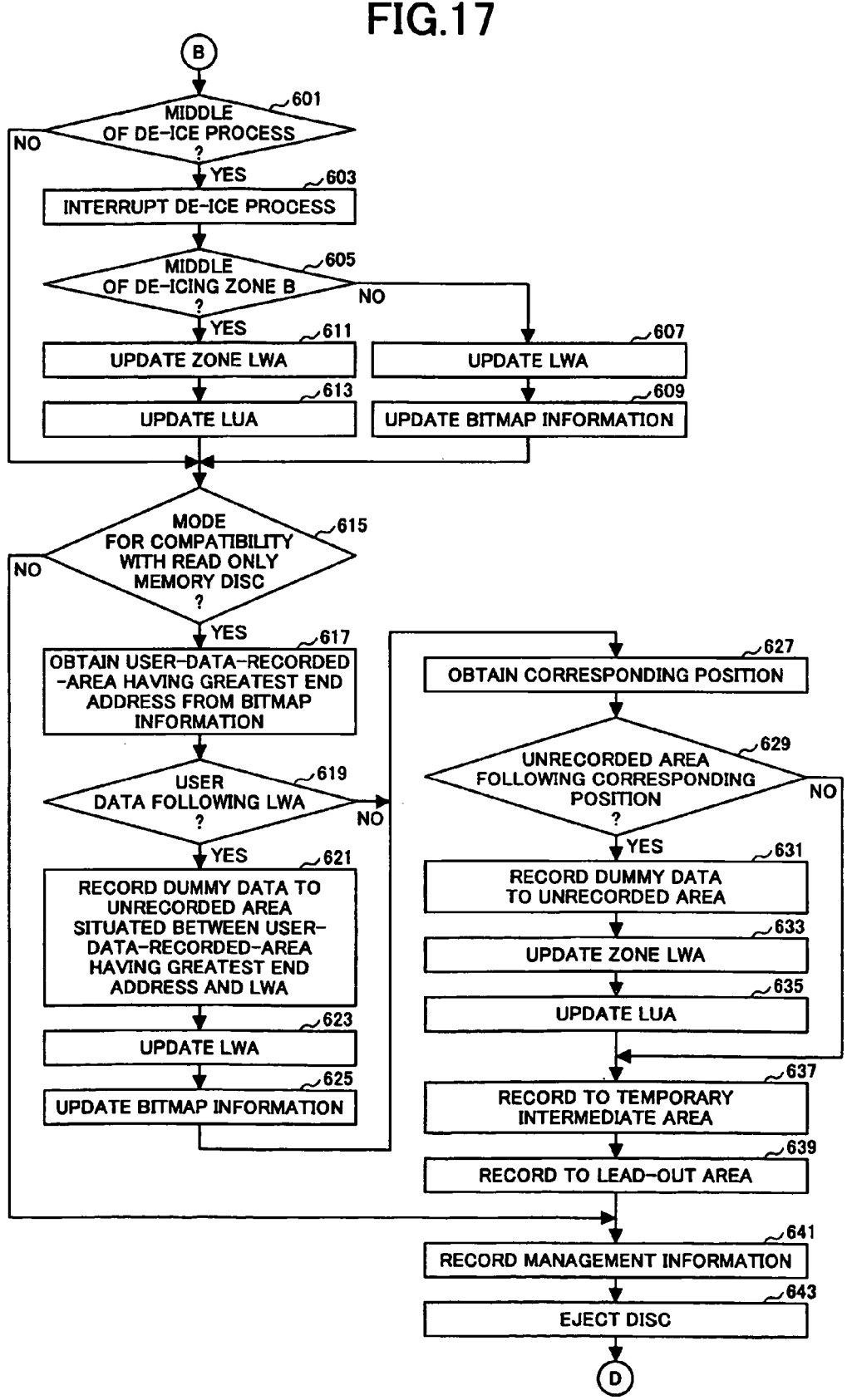
FIG. 17 is a flowchart for describing a process in a case where disk ejection is requested in the middle of the BGF process shown in FIG. 13.

Furthermore, the steps in the recording method according to an embodiment of the present invention including the steps of recording the last unwritten address to the information recording medium, recording the last written address to the information recording medium, and recording the zone last written address to the information recording medium are executed in the process shown in Step 641 of FIG. 17. The steps in the recording method according to an embodiment of the present invention including the step of recording data for providing compatibility with a read only memory information recording medium is executed in the processes shown in Steps 617-641 of FIG. 17.

With the optical disk apparatus (information recording apparatus) 20 according to an embodiment of the present invention, in a case where the user requests ejection of the optical disk 15 in a DVD-ROM (read only memory information recording medium) compatible mode during a BGF process, dummy data is recorded in an unrecorded area of the optical disk 15, prior to ejecting the optical disk 15, by referring to the last written address (LWA), the last unwritten address, and the zone last written address. Here, the optical disk 15 according to an embodiment of the present invention has a recording layer M0 (first recording layer) including a data area (first data area) to which continuously increasing addresses are allocated from the inner periphery of the optical disk 15 to the outer periphery of the optical disk 15 and a recording layer M1 (second recording layer) including a data area (second data area) to which continuously increasing addresses are allocated from the outer periphery of the optical disk 15 to the inner periphery of the optical disk 15. Accordingly, dummy data can be prevented from being recorded to an area where dummy data is already recorded. Thereby, a rewritable information recording medium having multiple layers can obtain compatibility with a read only memory information recording medium in a short time.

Furthermore, according to an embodiment of the present invention, when user data is recorded to the recording layer M0, the bit value of the bitmap information corresponding to the area recorded with the user data is changed from "1" to "0". On the other hand, when dummy data is recorded to the recording layer M1 in a de-ice process, the bit value of the bitmap information corresponding to the area recorded with the dummy data remains unchanged as "1" (i.e. remains in a state indicating an unrecorded state). Accordingly, by referring to the bitmap information, it can be easily determined whether user data is recorded in the recording layer M1. It is to be noted that, although it may be possible to determine whether data is recorded in the recording layer M1 by performing the de-ice process on the recording layer M1 and changing the bit value of the bitmap information corresponding to the area to which dummy data is recorded, this method has a problem of being unable to determine whether the data recorded in the recording layer M1 is user data even by referring to the bitmap information.

Furthermore, in an ejection process during the BGF process, the last written address (LWA), the last unwritten address (LUA), the zone last written address (zone LWA), and the bitmap information are recorded to a management information area in the optical disk 15 according to an embodiment of the present invention. That is, management information having a data structure including LWA, LUA, zone LWA, bitmap information is recorded in the management information area of the optical disk 15. Accordingly, even in a case where an ejected optical disk 15 is reinserted (reset) in the optical disk apparatus 20, the BGF process can be properly restarted. Furthermore, even in a case where user data is newly recorded to the reinserted (reset) optical disk 15, the optical disk 15 can obtain compatibility with a read only memory information recording medium. As described above, the optical disk 15 is provided with a management information area (information area) which includes a last unwritten address (LUA, information for identifying an area corresponding to an area situated at the end position of the data area of the recording layer M1 which has data recorded thereto). The information recorded in the management information area has a data structure including the LUA. Accordingly, an unrecorded area in the data area of the recording layer M1 (area in the data area of the recording layer M1 to which no data is recorded) can easily be detected by referring (accessing) to the management information area of the optical disk 15. Therefore, even in case where an area including user data (contents), an area including dummy data, and an unrecorded area coexist in the optical disk 15, the optical disk 15 can obtain compatibility with a DVD-ROM (read only memory information recording medium) at a short time.

Furthermore, as described above, the data area of each recording layer in the optical disk 15 according to an embodiment of the present invention is virtually divided into multiple zones (partial areas). In the BGF process, the de-ice process is performed alternately on the recording layer M0 and the recording layer M1, starting from the zone situated toward the inner periphery of the optical disk 15. This reduces the recording amount of dummy data for providing logical compatibility with a DVD-ROM in a case where disk ejection is requested during a BGF process. That is, compatibility to a read only memory information recording medium can be provided in a short amount of time.

Although the LWA is set to one recording layer of the optical disk 15 according to the above-described embodiment of the present invention, a LWA may be set to each recording layer of the optical disk 15. In this case, the LWA of the recording layer M0 includes the end position of the area to which data is continuously recorded from the start address of the first data area, the LWA of the recording layer M1 includes the end position of the area to which data is continuously recorded from the start address of the second data area. Accordingly, reference is made to the LWA of the recording layer M0 in a case where the end position of the area to which data is continuously recorded from the start position of the virtual data area is included in the first data area. On the other hand, reference is made to the LWA of the recording layer M1 in a case where the end position of the area to which data is continuously recorded from the start position of the virtual data area is included in the second data area. That is, the LWA corresponding to each recording layer are included in the LWA information.

Furthermore, management information may be provided to each recording layer. In this case, as shown in FIG. 21, the management information of recording layer N includes, for example, "identification ID", "restriction information for unknown identification ID", "drive ID", "update count", "format status", "last written address (LWA) of layer N", "last verified address (LVA) of layer N", "bitmap start address of layer N", "bitmap length of layer N", "disk ID", "layer number", "last unwritten address (LUA)", "zone last written address (zone LWA) of layer N", and "bitmap of layer N". In this example, information regarding "last written address (LWA)", "last verified address (LVA)", "bitmap start address", "bitmap length", "last unwritten address (LUA)", "zone last written address (zone LWA)", and "bitmap" are independently stored in correspondence with each layer. Here, the positions regarding the "last written address (LWA) of layer N", the "last verified address (LVA) of layer N", the "bitmap start address of layer N", the "bitmap length of layer N", the "last unwritten address (LUA)", the "zone last written address (zone LWA) of layer N", and the "bitmap of layer N" are not to be limited in the manner described above.

In this case, for example, the end address of the lead-in area is stored in the LWA in the management information corresponding to layer number N=0, and the end address of the intermediate area of the recording layer M1 is stored in the LWA in the management information corresponding to layer number N=1, immediately after the completion of the initial process of the BGF process. Furthermore, a corresponding end address in the recording layer M1 is stored in the LWA in the management information for layer number N=1 when data is recorded in the data area of the recording layer M1. In other words, the LWA for layer number N=1 and the LWA for layer number N=0 are separately set in the management information. Accordingly, the corresponding end addresses can be identified by referring to the LWA of each recording layer. Furthermore, since "last unwritten address (LUA) of layer N" includes information dedicated to each recording layer, the last unwritten address for layer number N=1 and N=0 are both set with "00000000h" in the management information, respectively.

Furthermore, information regarding the positions of the zones of the virtually divided areas may also be stored in the management information, as shown in FIG. 22. For example, "zone number m", "start address of zone 1", "end address of zone 1", ..., "start address of zone m", and "end address of zone m". It is to be noted that, either one of the start address or the end address may be provided as an alternative of providing both the start address and the end address. In this case, either one of the start/end addresses of each zone in the recording layer M0 or the start/end addresses of each zone in the recording layer M1 can be used as the start address and the end address since the zones of the recording layers M0 and M1 are situated at the radial positions.

Furthermore, as shown in FIG. 23, information regarding the positions of the zones of the virtually divided areas may also be added to the management information shown in FIG. 21. In this case, the start/end addresses of the zones of the recording layer M0 are stored in the management information corresponding to the recording layer M0, and the start/end addresses of the zones of the recording layer M1 are stored in the management information corresponding to the recording layer M1.

Although the foregoing embodiment of the present invention is described employing a single zone LWA, a zone LWA may alternatively be set, for example, to each zone in the recording layer M1. An example of a data structure of the management information corresponding to this case is shown in FIG. 24. Here, the management information includes, for example, "zone LWA of zone 1", ..., "zone LWA of zone m".

Furthermore, in the foregoing embodiment of the present invention, regardless of whether the LWA belongs to the recording layer M0 or the recording layer M1, the de-ice process is, first, performed on the zone situated more closer toward the inner periphery of the optical disk 15 (either zone A or zone B). Nevertheless, since it is apparent that data is recorded in the entire data area of the recording layer M0 when the LWA belongs to the recording layer M1, data is to be recorded to the entire data area of the recording layer M1 in order to provide logical compatibility with the DVD-ROM. Therefore, when it is determined that zone A belongs to the recording layer M1 in Step 429, the process may immediately proceed to Step 439.

Furthermore, the foregoing embodiment of the present invention describes the LWA, the LUA, the zone LWA, and the bitmap information being recorded in the management information area of the optical disk 15 in the ejection process during the BGF process. Alternatively, the LUA alone may be recorded in the management information area of the optical disk 15.

In the foregoing embodiment of the present invention, the bitmap information includes information for determining whether an unrecorded area (area where no data is recorded) exists in the data area of the recording layer M0 and information for determining whether a recorded area (area where user data is recorded) exists in the data area of the recording layer M1. Alternatively, bitmap information for determining whether an unrecorded area exists in the data area of the recording layer M0 and bitmap information for determining whether a recorded area exists in the data area of the recording layer M1 may be provided separately.

In the foregoing embodiment of the present invention, physical addresses which continuously increase from the inner periphery of the optical disk 15 to the outer periphery of the optical disk 15 are allocated in the recording layer M0 and physical addresses which continuously increase from the outer periphery of the optical disk 15 to the inner periphery of the optical disk 15 are allocated in the recording layer M1. Alternatively, physical addresses which continuously increase from the outer periphery of the optical disk 15 to the inner periphery of the optical disk 15 are allocated in the recording layer M0 and physical addresses which continuously increase from the inner periphery of the optical disk 15 to the outer periphery of the optical disk 15 are allocated in the recording layer M1.

Furthermore, in the foregoing embodiment of the present invention, the LWA is described as an address including the end address of the area to which data is consecutively recorded from the start address of the virtual data area. Alternatively, the LWA may include an address following the end address of the area to which data is consecutively recorded from the start address of the virtual data area (although the BGF process may require partial changes). In other words, as long as the area to which data is consecutively recorded from the start address of the virtual data area can be identified, the LWA may include an alternative address.

In the foregoing embodiment of the present invention, the LUA is described as an address including the end address of an area situated closest to the inner periphery of the optical disk 15 among the unrecorded areas in the data area of the recording layer M1. Alternatively, the LUA may include an address following the end address of an area situated closest to the inner periphery of the optical disk 15 among the unrecorded areas in the data area of the recording layer M1 (although the BGF process may require partial changes). Furthermore, the LUA may include pointer information indicating the head address of the data area of the recording layer M1 corresponding to the end address of the data area to which data is recorded. In other words, as long as the data area of the recording layer M1 corresponding to the end address of the data area to which data is recorded can be identified, the LUA may include an alternative address.

In the foregoing embodiment of the present invention, the start address of the target monitor zone is set as the zone LWA when no data is continuously recorded from the start position of the target monitor zone. Alternatively, the end address of the zone preceding the target monitor zone may be set as the zone LWA. In other words, an alternative address may be set as the zone LWA as long as it could be determined that no data is continuously recorded from the start position of the target monitor zone.

In the foregoing embodiment of the present invention, the program of the present invention is recorded to the flash memory 39. Alternatively, the program may be recorded to other recording media, such as a CD, a magneto-optic disk, a DVD, a memory card, a USB memory, a flexible disk. In this case, the program of the present invention is loaded to the flash memory 39 via a reproduction apparatus (or an interface) corresponding to the aforementioned recording media. Furthermore, the program of the present invention may be transferred to the flash memory 39 via a network such as LAN, intranet, or the Internet. In other words, the program of the present may be loaded to the flash memory 39 via an alternative apparatus or the like.

In the foregoing embodiment of the present invention, the optical disk 15 is described having the same physical properties as a DVD type disk. Alternatively, the optical disk 15 may have the physical properties that are the same as those of the next generation information recording medium, such as an information recording medium to which a laser beam having a wavelength of approximately 405 nm can be applied.

In the foregoing embodiment of the present invention, the optical pickup apparatus 23 is provided with a single semiconductor laser. Alternatively, the optical pickup apparatus 23 may be provided with multiple semiconductor lasers that emit beams of different wavelengths. For example, the optical pickup apparatus 23 may be provided with at least one of a semiconductor laser emitting a laser beam with a wavelength of approximately 405 nm, a semiconductor laser emitting a laser beam with a wavelength of approximately 660 nm, a semiconductor laser emitting a laser beam with a wavelength of approximately 780 nm. In other words, the optical disk apparatus 20 includes an optical disk apparatus which is compatible to multiple optical discs complying with various standards. In this case, at least one of the optical discs is an optical disk having multiple layers.

Furthermore, in the foregoing embodiment of the present invention, the information recording medium of the present invention is described as the optical disk 15. Alternatively, the other types of information recording media may be employed. In such a case, an information recording apparatus applicable to the alternative information recording medium is used as an alternative of the optical disk apparatus 20.

Furthermore, in the foregoing embodiment of the present invention, the data area of each recording layer is virtually divided into four zones from zone [N:0] to zone [N:3]. Alternatively, the data area of each recording layer may be virtually divided into more than four zones. Alternatively, the data area of each recording layer may not even be virtually divided into multiple zones.

MODIFIED EXAMPLE

Next, with reference to FIGS. 25A-28C, a modified example of performing the BGF process is described in a case where the data area of each recording layer is not virtually divided into multiple zones.

For the sake of convenience, it is supposed that the optical disk 15 has user data recorded thereto immediately after the initial process, and is then ejected from the optical disk apparatus 20. Furthermore, user data is continuously recorded from the start address of the data area of the recording layer M0. Furthermore, the ejected optical disk 15 has logical compatibility with the single sided dual layer DVD-ROM.

Figure 25A:
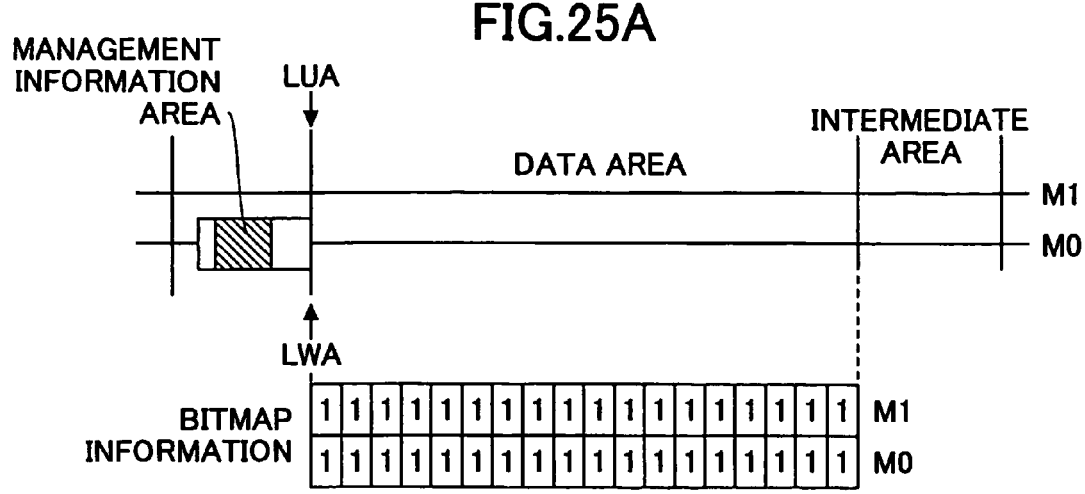
FIGS. 25A-25C are drawings of a modified example (modified example 1) of a BGF process of the optical disk apparatus shown in FIG. 1, respectively.

The state of each recording layer is shown in FIG. 25A in a case where the initial process is completed. In this example, only a portion of the lead-in area is recorded. As shown in FIG. 26A, the management information has a data structure including, for example, "identification ID", "restriction information for unknown identification ID", "drive ID", "update count", "format status", "last written address (LWA)", "last verified address (LVA)", "bitmap start address", "bitmap length", "disk ID", "last unwritten address (LUA)" and "bitmap". In other words, the management information in this example does not include a "zone LWA". It is to be noted that the positions of the "last written address (LWA)", the "last unwritten address (LUA)", and the "bitmap" are not to be limited to the aforesaid positions.

It is to be noted that, management information may be provided to each recording layer as shown in FIG. 26B. In this case, the management information of recording layer N includes, for example, "identification ID", "restriction information for unknown identification ID", "drive ID", "update count", "format status", "last written address (LWA) of layer N", "last verified address (LVA) of layer N", "bitmap start address of layer N", "bitmap length of layer N", "disk ID", "layer number", "last unwritten address (LUA)", and "bitmap of layer N". It is to be noted that the positions of the "last written address (LWA)", the "last unwritten address (LUA) of layer N", and the "bitmap of layer N" are not to be limited to the aforesaid positions.

When the initial process is completed, completion of the formatting process is reported to the upper apparatus 90 and user data can be recorded to the optical disk 15. Likewise to the above-described embodiment of the present invention, the end address of the lead-in area is set as the initial value for the LWA, and the end address of the data area of the recording layer M1 is set as the initial value for the LUA. Furthermore, all of the bit values in the bitmap information area set as "1".

After completion of the initial process, user data is recorded from the start address of the data area of the recording layer M0 (See FIG. 25B) when recording of user data is requested. Then, the LWA is updated in accordance with the recording of the user data, and the bit values of the bitmap information corresponding to the areas to which user data are recorded is changed from "1" to "0".

Figure 25B:
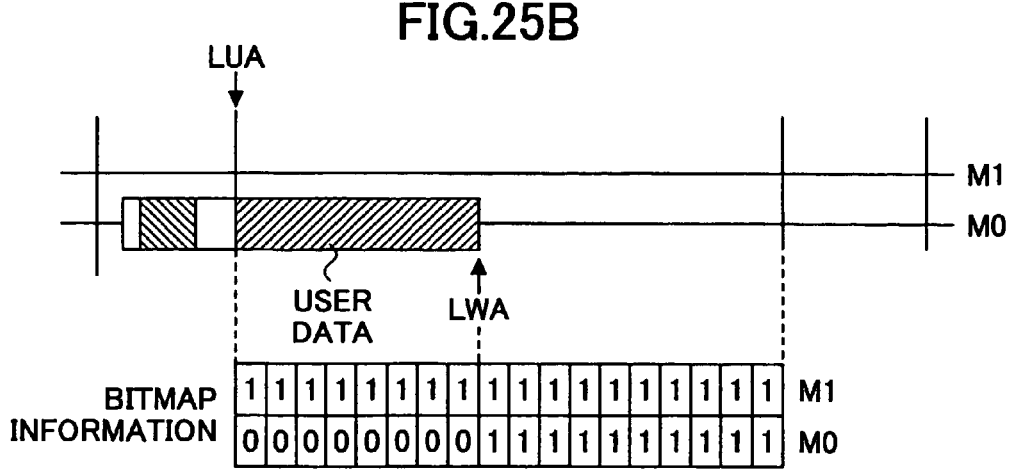

When disk ejection is requested during a state shown in FIG. 25B, dummy data is recorded to an unrecorded area following a corresponding position in the data area of the recording layer M1 that corresponds to the end position of the area to which data (in this example, user data) is recorded. Thus, the address preceding the area to which the dummy data is recorded becomes the new LUA. It is to be noted that, the bit values of the bitmap information corresponding to the area to which dummy data is recorded remain unchanged as "1".

Figure 25C:
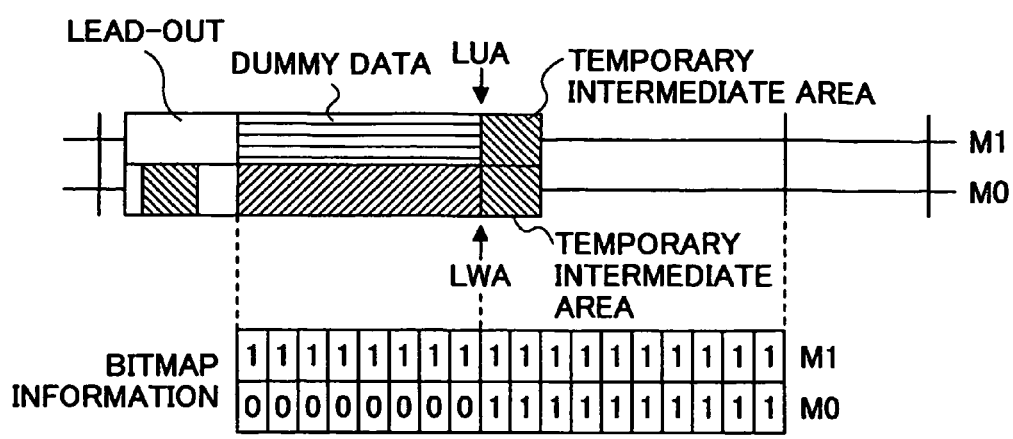

Next, as shown in FIG. 25C, data is recorded to a temporary intermediate area having a predetermined size, in which the temporary intermediate area is provided at an area following the LWA in the recording layer M0 and at an area preceding the LUA in the recording layer M1. Then, data is recorded to the lead-out area. Accordingly, an information area having no unrecorded area can be obtained. Thus, the optical disk 15 can attain logical compatibility with a DVD-ROM.

The following example describes a case where the optical disk 15 is ejected from the optical disk apparatus 20 in the state shown in FIG. 25C, then reinserted into the optical disk apparatus 20, and then subject to processes of recording user data and disk ejection.

Figure 27A:
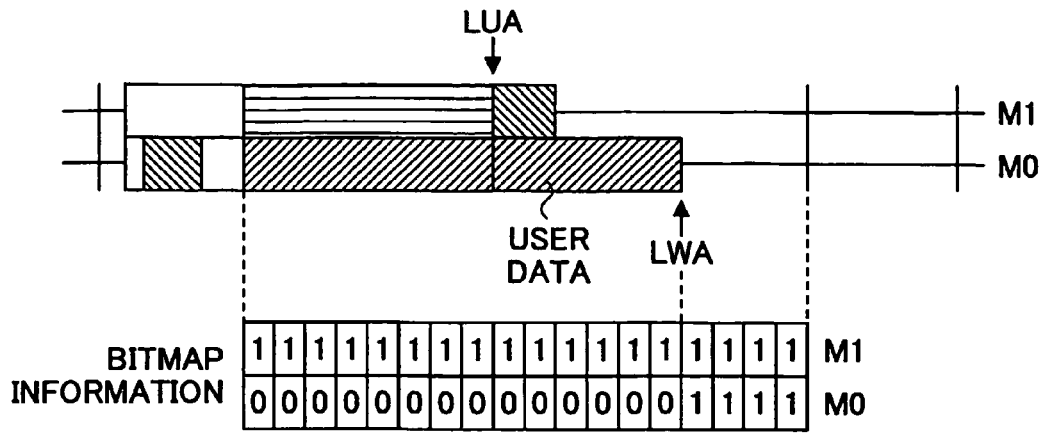
FIGS. 27A-27C are drawings of a modified example (modified example 2) of a BGF process of the optical disk apparatus shown in FIG. 1, respectively.

When the optical disk 15, being in a state where BGF process is unfinished, is reinserted into the optical disk apparatus 20, the BGF process of the optical disk 15 is restarted. In this case, user data can be recorded to the optical disk 15 immediately. In this example, when the user request the user data to be recorded in the area following the LWA, the intermediate area of the recording layer M0 is overwritten by the user data, as shown in FIG. 27A. Accordingly, the LWA is updated, and the bit values of the bitmap information corresponding to the overwritten area are changed to "0".

Figure 27B:
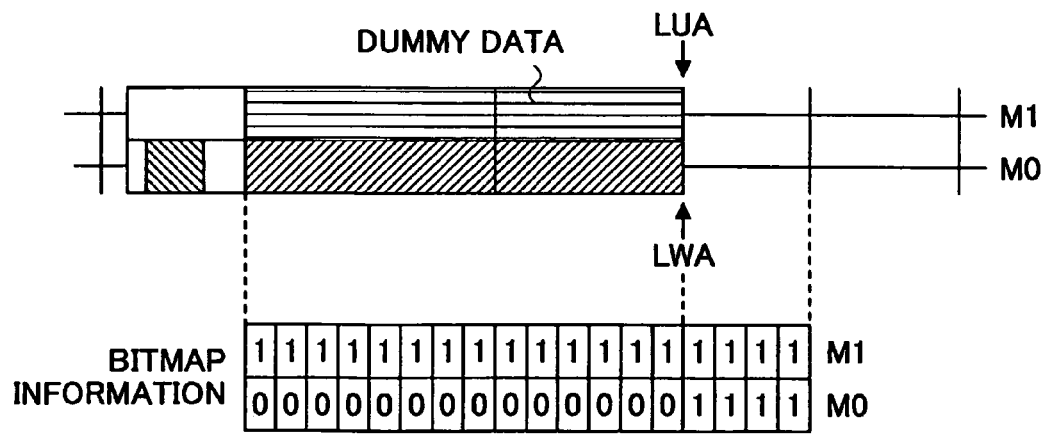

Next, in a case where disk ejection is requested when the optical disk 15 is in a state shown in FIG. 27A, dummy data is recorded to an unrecorded area in a corresponding area (corresponding position) of M1, in which the unrecorded area is provided in correspondence with the end position of the recorded area (in this example, the area recorded with user data) of the recording layer M0, as shown in FIG. 27B. In this example, dummy data is recorded from an address in the recording layer M1 corresponding to the LWA of the recording layer M0 to the LUA of the recording layer M1. Accordingly, the address preceding the area to which the dummy data is recorded becomes the new LUA. It is to be noted that, the bit values of the bitmap information corresponding to the area to which dummy data is recorded remain unchanged as "1".

Figure 27C:
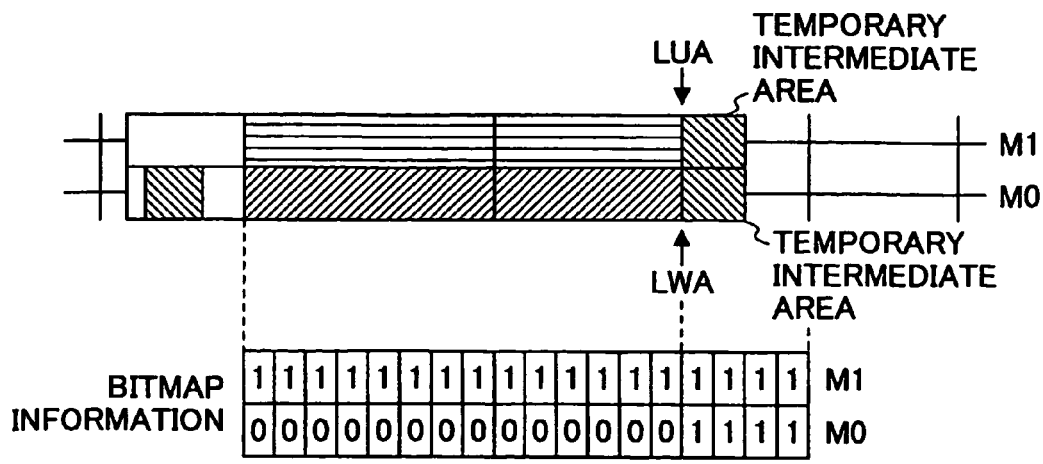

Next, as shown in FIG. 27C, data is recorded to a temporary intermediate area having a predetermined size, in which the temporary intermediate area is provided at an area following the LWA in the recording layer M0 and at an area preceding the LUA in the recording layer M1. Accordingly, an information area having no unrecorded area can be obtained. Thus, the optical disk 15 can attain logical compatibility with a DVD-ROM.

Likewise to the foregoing embodiment of the present invention, this modified example of the present invention is also able to provide compatibility with a read only memory information recording medium at a short time.

The modified example of the present invention is described in relation with the BGF process. In addition, besides a case of performing the BGF process, dummy data recorded in the recording layer M1 may also be managed according to, for example, LUA for sequentially recording data from the start position of the data area.

Figure 28A:
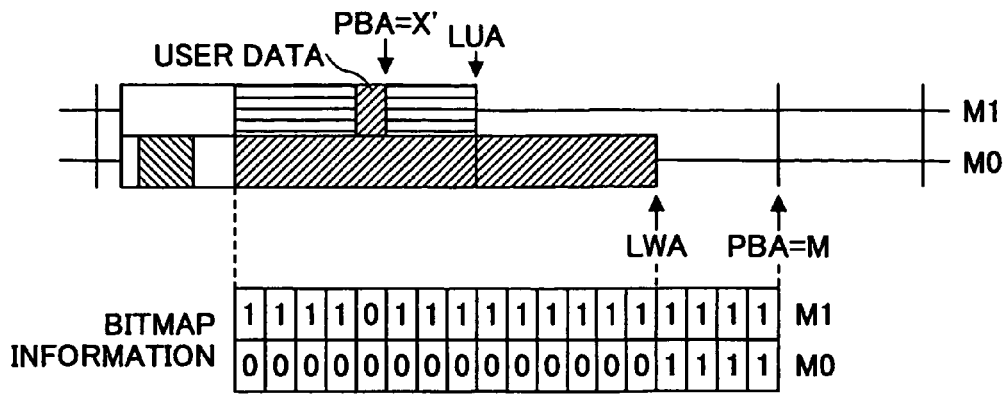
FIGS. 28A-28C are drawings for describing a case where user data is recorded after LUA during disk ejection in the middle of a BGF process, respectively.

Next, FIG. 28A shows a case where there is a disk ejection request during (in the middle of) a BGF process for an optical disk 15 having user data recorded in an area following the LUA (referred to as "physical address X'"). It is to be noted that, the existence of user data recorded in the area of physical address X' can be recognized since the bit value of the bitmap information corresponding to the recorded area is "0". Such recognition is possible since the bit values of the bitmap information corresponding to the data area of the recording layer M1 are changed to "0" only when user data is recorded in the data area of the recording layer M1. Accordingly, dummy data and user data following the LUA can be clearly distinguished by referring to the bitmap information.

Figure 28B:
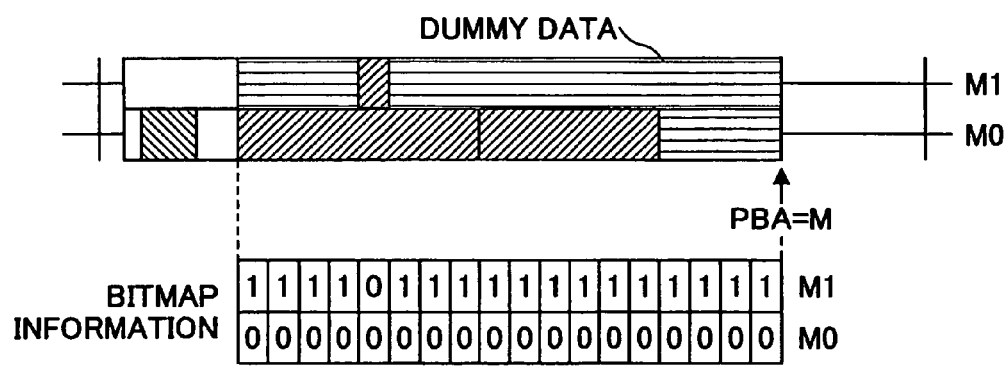

In this case, dummy data is recorded in the unrecorded area of the data area situated between the LWA of the recording layer M0 and the LUA of the recording layer M1. For example, as shown in FIG. 28B, dummy data is recorded in the area between the LWA to the end address (in this example, M−1) of the data area in the recording layer M0, and in the area between the start address of the data area in the recording layer M1 and the LUA.

Figure 28C:
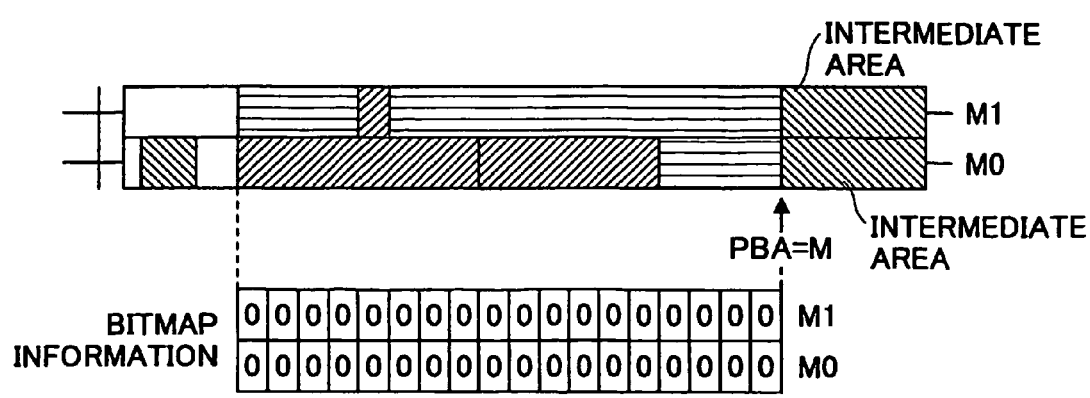

Next, as shown in FIG. 28C, predetermined data is recorded to the intermediate layer of each recording layer, the remaining lead-in area, and the remaining lead-out area.

As described above, the process of providing logical compatibility for a DVD-ROM is different between a case where no user data is recorded in the area following the LUA and a case where user data is recorded in the area following the LUA. This difference exists since the allocation of the logical address corresponding to the data area in the recording layer M1 differs depending on the position of the intermediate area.

That is, at the point when user data is recorded in the area of physical address X' (See FIG. 28A), the intermediate area is set to a position of physical address M. Therefore, the logical address corresponding to physical address X' becomes (2M−X)−30000h. Hence, the recorded user data (e.g. file) is managed by the file management information together with the corresponding logical address.

In this case, supposing that dummy data is recorded to an area between an address of a position (corresponding position) corresponding to the LWA (physical address indicated as N−1) and the LUA, and that temporary intermediate areas are provided at an area following the LWA and at an area preceding the corresponding position (in the same manner where no user data is recorded in the area following the LUA), the logical address of the user data corresponding to physical address X' Becomes (2N−X)−30000h. Accordingly, this causes an undesired mismatch between the location where the file is stored in the file management information and the location where the actual data is recorded.

Therefore, from the aspect of obtaining a corresponding relation between the physical address and the logical address in the recording layer M1, the position of the intermediate area cannot be changed after user data is recorded to the recording layer M1.

Further, the present invention is not limited to these embodiments, but various variations and modifications may be made without departing from the scope of the present invention.

The present application is based on Japanese Priority Application Nos. 2004-179754 and 2004-187989 filed on Jun. 17, 2004, and Jun. 25, 2004, with the Japanese Patent Office, the entire contents of which are hereby incorporated by reference.

The invention claimed is:

1. A recording method for recording information to a rewritable information recording medium having at least a first recording layer provided with a first data area having a plurality of first addresses allocated thereto and a second recording layer provided with a second data area having a plurality of second addresses allocated thereto, the plurality of first addresses of the first data area continuously increasing in numerical value in a first direction with respect to a radial position of the recording medium, the plurality of second addresses of the second data area continuously increasing in numerical value in a second direction opposite to the first direction with respect to the radial position, the recording method comprising a step of:

recording end recorded area information to the information recording medium, the end recorded area information including the largest end address of an unrecorded area among unrecorded areas in the second data area, wherein the end recorded area information identifies a recorded area on the second data area having an end address corresponding to the end address of the second data area.

2. A recording method for recording information to a rewritable information recording medium having at least a first recording layer provided with a first data area having a plurality of first addresses allocated thereto and a second recording layer provided with a second data area having a plurality of second addresses allocated thereto, the plurality of first addresses of the first data area continuously increasing in numerical value in a first direction with respect to a radial position of the recording medium, the plurality of second addresses of the second data area continuously increasing in numerical value in a second direction opposite to the first direction with respect to the radial position, the recording method comprising a step of:

recording end recorded area information to the information recording medium, the end recorded area information including an address following the largest end address of an unrecorded area among unrecorded areas in the second data area, wherein the end recorded area information identifies a recorded area on the second data area having an end address corresponding to the end address of the second data area.

3. A recording method for recording information to a rewritable information recording medium having at least a first recording layer provided with a first data area having a plurality of first addresses allocated thereto and a second recording layer provided with a second data area having a plurality of second addresses allocated thereto, the plurality of first addresses of the first data area continuously increasing in numerical value in a first direction with respect to a radial position of the recording medium, the plurality of second addresses of the second data area continuously increasing in numerical value in a second direction opposite to the first direction with respect to the radial position, the recording method comprising a step of:

recording end recorded area information to the information recording medium, the end recorded area information identifying a recorded area on the second data area having an end address corresponding to the end address of the second data area, said recorded area being adjacent to an unrecorded area situated closest to an inner periphery of the information recording medium having the largest end address among unrecorded areas in the second data area, and the end recorded area information including the largest end address of the unrecorded area among the unrecorded areas in the second data area.

4. A recording method according to claim 3, wherein the end recorded area information includes an address following the largest end address of the unrecorded area situated closest to the inner periphery of the information recording medium among the unrecorded areas in the second data area.

5. A recording method according to claim 3 or 4, wherein the end recorded area information includes pointer information indicating a head address of the second data area.

6. A recording method according to any one of claim 3, 4 or 5, wherein the end recorded area information is information related to an end position of an unrecorded area situated at a position in the second data area that is nearest to the end position of the second data area.

7. A recording method according to any one of claims 1, 2, 3, or 4 to 6, comprising recording to the information recording medium using a laser, wherein the first recording layer is located closer to the laser than the second recording layer.

8. A recording method according to any one of claims 1, 2, 3, or 4 to 7, wherein the first direction is a direction oriented from an inner periphery of the information recording medium to an outer periphery of the information recording medium, wherein the second direction is a direction oriented from the outer periphery of the information recording medium to the inner periphery of the information recording medium.

9. A recording method according to any one of claims 1, 2, 3, or 4 to 8, comprising recording reference recorded area information to the information recording medium for identifying an area to which data is continuously recorded from a reference position provided in the second data area.

10. A recording method according to any one of claims 1, 2, 3, or 4 to 9, wherein the first data area and the second data area have logical addresses continuing from a start position of the first data area to an end position of the second data area.

11. A recording method according to any one of claims 1, 2, 3, or 4 to 10, further comprising recording start recorded area information for identifying an area to which data is continuously recorded from a start position of a combined data area including the first data area and the second data area.

12. A recording method according to claim 11, wherein the start recorded area information is information related to an end position of an area to which data is continuously recorded from the start position of the combined data area.

13. A recording method according to claim 12, wherein the start position of the combined data area is the lowest address of the first data area.

14. A recording method according to claim 13, wherein the start recorded area information includes information indicative of an end position of an area to which data is continuously recorded from a start position of the first data area in the first recording layer, and information indicative of an end position of an area to which data is continuously recorded from a start position of the second data area in the second recording layer.

15. A recording method according to any one of claims 11 to 14, further comprising:
   recording data for making the information recording medium compatible with a read only memory information recording medium by referring to the start recorded area information and the end recorded area information recorded to the information area of the information recording medium.

16. An information recording apparatus for recording information to a rewritable information recording medium having at least a first recording layer provided with a first data area having a plurality of first addresses allocated thereto and a second recording layer provided with a second data area having a plurality of second addresses allocated thereto, the plurality of first addresses of the first data area continuously increasing in numerical value in a first direction with respect to a radial position of the recording medium, the plurality of second addresses of the second data area continuously increasing in numerical value in a second direction opposite to the first direction with respect to the radial position, the information recording apparatus comprising:
   a recording part for recording data to a designated recording layer among the recording layers of the information recording medium;
   a process apparatus for recording end recorded area information to the information recording medium via the recording part, the end recorded area information including the largest end address of an unrecorded area among unrecorded areas in the second data area, wherein the end recorded area information is arranged to identify a recorded area on the second data area having an end address corresponding to the end address of the second data area.

17. An information recording apparatus for recording information to a rewritable information recording medium having at least a first recording layer provided with a first data area having a plurality of first addresses allocated thereto and a second recording layer provided with a second data area having a plurality of second addresses allocated thereto, the plurality of first addresses of the first data area continuously increasing in numerical value in a first direction with respect to a radial position of the recording medium, the plurality of second addresses of the second data area continuously increasing in numerical value in a second direction opposite to the first direction with respect to the radial position, the information recording apparatus comprising:
   a recording part for recording data to a designated recording layer among the recording layers of the information recording medium;
   a process apparatus for recording end recorded area information to the information recording medium via the recording part, the end recorded area information including an address following the largest end address of an unrecorded area among unrecorded areas in the second data area, wherein the end recorded area information is arranged to identify a recorded area on the second data area having an end address corresponding to the end address of the second data area.

18. An information recording apparatus for recording information to a rewritable information recording medium having at least a first recording layer provided with a first data area having a plurality of first addresses allocated thereto and a second recording layer provided with a second data area having a plurality of second addresses allocated thereto, the plurality of first addresses of the first data area continuously increasing in numerical value in a first direction with respect to a radial position of the recording medium, the plurality of second addresses of the second data area continuously increasing in numerical value in a second direction opposite to the first direction with respect to the radial position, the information recording apparatus comprising:
   a recording part for recording data to a designated recording layer among the recording layers of the information recording medium;
   a process apparatus for recording end recorded area information to the information recording medium via the recording part, the end recorded area information being for identifying a recorded area on the second data area having an end address corresponding to the end address of the second data area, said recorded area being adjacent to an unrecorded area situated closest to an inner periphery of the information recording medium having the largest end address among unrecorded areas in the second data area, and the end recorded area information including the largest end address of the unrecorded area among the unrecorded areas in the second data area.

19. Apparatus according to claim 18, wherein the end recorded area information includes an address following the largest end address of the unrecorded area situated closest to the inner periphery of the information recording medium among the unrecorded areas in the second data area.

20. Apparatus according to claim 18 or 19, wherein the end recorded area information includes pointer information indicating a head address of the second data area.

21. Apparatus according to any one of claim 18, 19 or 20, wherein the end recorded area information is information related to an end position of an unrecorded area situated at a position in the second data area that is nearest to the end position of the second data area.

22. Apparatus according to any one of claims 16, 17, 18, or 19 to 21, wherein the recording part is adapted to record to the information recording medium using a laser, and the first recording layer is located closer to the laser than the second recording layer.

23. Apparatus according to any one of claims 16, 17, 18, or 19 to 22, wherein the first direction is a direction oriented from an inner periphery of the information recording medium to an outer periphery of the information recording medium, wherein the second direction is a direction oriented from the outer periphery of the information recording medium to the inner periphery of the information recording medium.

24. Apparatus according to any one of claims 16, 17, 18, or 19 to 23, wherein the process apparatus is arranged to record reference recorded area information via the recording part, the record reference recorded area information being for identifying an area to which data is continuously recorded from a reference position provided in the second data area.

25. Apparatus according to any one of claims 16, 17, 18, or 19 to 24, wherein the first data area and the second data area have logical addresses continuing from a start position of the first data area to an end position of the second data area.

26. Apparatus according to any one of claims 16, 17, 18, or 19 to 25, wherein the process apparatus is adapted to record start recorded area information to the information recording medium via the recording part, the start recorded area information including information being for identifying an area to which data is continuously recorded from a start position of a combined data area including the first data area and the second data area.

27. Apparatus according to claim 26, wherein the start recorded area information is information related to an end position of an area to which data is continuously recorded from the start position of the combined data area.

28. Apparatus according to claim 27, wherein the start position of the combined data area is the lowest address of the first data area.

29. Apparatus according to claim 26, wherein the start recorded area information includes information indicative of an end position of an area to which data is continuously recorded from a start position of the first data area in the first recording layer, and information indicative of an end position of an area to which data is continuously recorded from a start position of the second data area in the second recording layer.

30. Apparatus according to any one of claims 16, 17, 18, or 19 to 29, wherein the apparatus is arranged such that when dummy data is recorded to the second data area, the end recorded area information is updated in correspondence with the area to which the dummy data is recorded.

31. Apparatus according to any one of claims 16, 17, 18, or 19 to 30, wherein the process apparatus is further adapted to record data for making the information recording medium compatible with a read only memory information recording medium via the recording part by referring to the start recorded area information and the end recorded area information recorded to the information area of the information recording medium.

32. Apparatus according to claim 31, wherein when the area identified by the start recorded area information is entirely included in the first data area, the process apparatus is arranged to record dummy data, via the recording part, to an unrecorded area situated between a position in the second data area situated at a same radial position as an end position identified by the start recorded area information and a start position identified by the end recorded area information.

33. Apparatus according to claim 31, wherein when the area identified by the start recorded area information is entirely included in the first data area, the process apparatus is arranged to record dummy data, via the recording part, to an unrecorded area situated between a position in the second data area with a bit inverted address as an end position identified by the start recorded area information and a start position identified by the end recorded area information.

34. Apparatus according to claim 32, wherein the process apparatus is arranged to record a first intermediate area data to an area following the identified area in the first data area via the recording part and to record a second intermediate area data to an area in the second data area situated at a same radial position as the intermediate area in the first data area via the recording part.

35. Apparatus according to claim 32, wherein the process apparatus is arranged to record a first intermediate area data to an area following the identified area in the first data area via the recording part and to record a second intermediate area data to an area in the second data area situated at the bit inverted address corresponding to the intermediate area in the first data area via the recording part.

36. Apparatus according to any one of claims 33 to 35, wherein the process apparatus is arranged to obtain identification information including information for identifying an area in the second data area to which user data is recorded.

37. Apparatus according to claim 36, wherein the identification information further includes information for identifying an unrecorded area in the first data area.

38. Apparatus according to any one of claims 31 to 37, wherein the process apparatus is further adapted to obtain identification information including information for identifying an area, following the area identified by the start recorded area information, to which user data is recorded.

39. Apparatus according to claim 36, wherein when user data is recorded in the area identified by the end recorded area information, the process apparatus is arranged to record dummy data, via the recording part, to an unrecorded area situated between an end position of the area identified by the start recorded area information and a start position of the area identified by the end recorded area information.

40. Apparatus according to any one of claims 26 to 39, further comprising a formatting part for formatting the information recording medium, wherein the first and second data areas of the first and second recording layers are divided into a plurality of zones, wherein dummy data is recorded to the plural zones via the recording part and the information recording medium is formatted when there is no request for accessing the information recording medium.

41. Apparatus according to claim 40, wherein the formatting part is arranged to obtain reference recorded area information including information for identifying an area to which data is continuously recorded from a reference position, wherein the reference position is a start position of one of the plural zones, wherein the one of the zones includes an end position of an unrecorded area situated adjacent to an area identified by the end recorded area information.

42. Apparatus according to claim 40, wherein the start position of each zone is set as a reference position, wherein area information is set in correspondence with the zones for identifying the area to which data is continuously recorded from the reference position, wherein the formatting part obtains the area information of one of zones as reference recorded area information, wherein the one of the zones includes an end position of an unrecorded area situated adjacent to an area identified by the end recorded area information.

43. Apparatus according to claim 41, wherein in a case of where the formatting part records dummy data to the one of the zones in the second data area, the apparatus is arranged to record dummy data to an unrecorded area situated between an end position of an area identified by the reference recorded area information and a start position of an area identified by the end recorded area information.

44. Apparatus according to claim 41, wherein the process apparatus is further adapted to record the reference recorded area information to the information recording medium via the recording part.

45. Apparatus according to claim 40, wherein the first direction of the first data area is a direction oriented from an inner periphery of the information recording medium to an outer periphery of the information recording medium, wherein the second direction of the second data area is a direction oriented from the outer periphery of the information recording medium to the inner periphery of the information recording medium, wherein among the zone including the start position of the unrecorded area adjacent to the area identified by the start recorded area information and the zone including the end position of the unrecorded area adjacent to the area identified by the end recorded area information, the formatting part is adapted to record dummy data from the zones situated toward the inner periphery of the information recording medium in a case where the end position of the area identified by the start recorded area information belongs to the first data area.

46. A rewritable information recording medium having at least a first recording layer and a second recording layer, the information recording medium comprising:
    a first data area situated in the first recording layer, the first data area having a plurality of first addresses allocated thereto, the plurality of first addresses continuously increasing in numerical value in a first direction with respect to a radial position of the recording medium;
    a second data area situated in the second recording layer, the second data area having a plurality of second addresses allocated thereto, the plurality of second addresses continuously increasing in numerical value in a second direction opposite to the first direction with respect to the radial position; and
    an information area having an area for recording end recorded area information thereto, the end recorded area information including the largest end address of an unrecorded area among unrecorded areas in the second data area, wherein the end recorded area information is for identifying a recorded area on the second data area having an end address corresponding to the end address of the second data area.

47. A rewritable information recording medium having at least a first recording layer and a second recording layer, the information recording medium comprising:
    a first data area situated in the first recording layer, the first data area having a plurality of first addresses allocated thereto, the plurality of first addresses continuously increasing in numerical value in a first direction with respect to a radial position of the recording medium;
    a second data area situated in the second recording layer, the second data area having a plurality of second addresses allocated thereto, the plurality of second addresses continuously increasing in numerical value in a second direction opposite to the first direction with respect to the radial position; and
    an information area having an area for recording end recorded area information thereto, the end recorded area information including an address following the largest end address of an unrecorded area among unrecorded areas in the second data area, wherein the end recorded area information is for identifying a recorded area on the second data area having an end address corresponding to the end address of the second data area.

48. A rewritable information recording medium having at least a first recording layer and a second recording layer, the information recording medium comprising:
    a first data area situated in the first recording layer, the first data area having a plurality of first addresses allocated thereto, the plurality of first addresses continuously increasing in numerical value in a first direction with respect to a radial position of the recording medium;
    a second data area situated in the second recording layer, the second data area having a plurality of second addresses allocated thereto, the plurality of second addresses continuously increasing in numerical value in a second direction opposite to the first direction with respect to the radial position; and
    an information area having an area for recording end recorded area information thereto, the end recorded area information being for identifying a recorded area on the second data area having an end address corresponding to the end address of the second data area, said recorded area being adjacent to an unrecorded area situated closest to an inner periphery of the information recording medium having the largest end address among unrecorded areas in the second data area, and the end recorded area information including the largest end address of the unrecorded area among the unrecorded areas in the second data area.

49. An information recording medium according to claim 48, wherein the end recorded area information includes an address following the largest end address of the unrecorded area situated closest to the inner periphery of the information recording medium among the unrecorded areas in the second data area.

50. An information recording medium according to any one of claim 48 or 49, wherein the end recorded area information includes pointer information indicating a head address of the second data area.

51. An information recording medium according to any one of claim 46, 47, 48, 49, or 50, wherein the end recorded area information is information related to an end position of an unrecorded area situated at a position in the second data area that is nearest to the end position of the second data area.

52. An information recording medium according to any one of claims 46, 47, 48, or 49 to 51, wherein the information recording medium is adapted to be read or recorded by a laser, and the first recording layer is located closer to the laser than the second recording layer.

53. An information recording medium according to any one of claims 46, 47, 48, or 49 to 52, wherein the first direction is a direction oriented from an inner periphery of the information recording medium to an outer periphery of the information recording medium, wherein the second direction is a direction oriented from the outer periphery of the information recording medium to the inner periphery of the information recording medium.

54. An information recording medium according to any one of claims 46, 47, 48, or 49 to 53, wherein the management information area further includes reference recorded area information for identifying an area to which data is continuously recorded from a reference position provided in the second data area.

55. An information recording medium according to any one of claims 46, 47, 48, or 49 to 54, wherein the first data area and the second data area have logical addresses continuing from a start position of the first data area to an end position of the second data area.

56. An information recording medium according to any one of claims 46, 47, 48, or 49 to 55, wherein the information area further includes start recorded area information for identifying an area to which data is continuously recorded from a start position of a combined data area including the first data area and the second data area.

57. An information recording medium according to claim 56, wherein the start recorded area information is information related to an end position of an area to which data is continuously recorded from the start position of the combined data area.

58. An information recording medium according to claim 57, wherein the start position of the combined data area is the lowest address of the first data area.

59. An information recording medium according to claim 56, wherein the start recorded area information includes information indicative of an end position of an area to which data is continuously recorded from a start position of the first data area in the first recording layer, and information indicative of an end position of an area to which data is continuously recorded from a start position of the second data area in the second recording layer.

60. A data structure of information for being recorded to the information area in the information recording medium in claim 46, the data structure comprising:
end recorded area information including the largest address of unrecorded area in the second data area.

61. A data structure of information for being recorded to the information area in the information recording medium in claim 47, the data structure comprising:
end recorded area information including an address following the largest address of unrecorded area in the second data area.

62. A data structure of information for being recorded to the information area in the information recording medium in claim 48, the data structure comprising:
end recorded area information for identifying a recorded area on the second data area having an end address corresponding to the end address of the second data area, said recorded area being adjacent an area having the largest address among unrecorded area on the second data area.

63. A program for causing a computer of an information recording apparatus to carry out the method of any one of claims 1, 2, 3, or 4 to 15.

64. A computer readable medium comprising:
the program in claim 63.

* * * * *